US006289362B1

(12) United States Patent
Van Der Meer

(10) Patent No.: US 6,289,362 B1
(45) Date of Patent: Sep. 11, 2001

(54) SYSTEM AND METHOD FOR GENERATING, TRANSFERRING AND USING AN ANNOTATED UNIVERSAL ADDRESS

(75) Inventor: Joannes Jozef Everardus Van Der Meer, Amersfoort (NL)

(73) Assignee: Aidministrator Nederland B.V., Amersfoort (NL)

( * ) Notice: Subject to any disclaimer, the term of this patent is extended or adjusted under 35 U.S.C. 154(b) by 0 days.

(21) Appl. No.: 09/144,717

(22) Filed: Sep. 1, 1998

(51) Int. Cl.[7] .................................................. G06F 17/00
(52) U.S. Cl. ..................... 707/501; 709/200; 709/213; 709/217; 709/218
(58) Field of Search ................... 382/178; 345/329; 707/2, 100, 4, 501, 503, 505–508, 512; 709/213, 217, 218, 200

(56) References Cited

U.S. PATENT DOCUMENTS

| 5,109,515 | | 4/1992 | Laggis et al. . | |
|---|---|---|---|---|
| 5,182,705 | | 1/1993 | Barr et al. | 364/401 |
| 5,557,798 | | 7/1996 | Skeen et al. | 395/650 |
| 5,572,602 | * | 11/1996 | Naoi et al. | 382/178 |
| 5,666,501 | | 9/1997 | Jones et al. . | |
| 5,778,386 | * | 7/1998 | Hogan et al. | 707/10 |
| 5,796,393 | * | 8/1998 | MacNaughton et al. | 345/329 |
| 5,802,510 | * | 9/1998 | Jones | 707/2 |
| 5,815,661 | | 9/1998 | Gosling | 395/200.46 |
| 5,832,274 | | 11/1998 | Cutler et al. . | |
| 5,859,969 | | 1/1999 | Oki et al. . | |
| 5,870,562 | | 2/1999 | Butman et al. . | |
| 5,878,423 | * | 3/1999 | Anderson et al. | 707/100 |
| 5,881,236 | | 3/1999 | Dickey . | |
| 5,892,905 | | 4/1999 | Brandt et al. . | |
| 5,903,762 | | 5/1999 | Sakamoto et al. . | |
| 5,913,210 | * | 6/1999 | Call | 707/4 |
| 5,923,846 | | 7/1999 | Gage et al. | 395/200.43 |
| 5,926,623 | | 7/1999 | Tsukakoshi et al. | 395/200.3 |
| 5,926,798 | | 7/1999 | Carter | 705/26 |
| 5,987,506 | * | 11/1999 | Carter et al. | 709/213 |
| 6,006,227 | | 12/1999 | Freeman et al. | 707/7 |
| 6,014,134 | * | 1/2000 | Bell et al. | 345/329 |
| 6,020,884 | * | 2/2000 | MacNaughton et al. | 345/329 |
| 6,021,426 | * | 2/2000 | Douglis et al. | 709/200 |
| 6,076,166 | * | 6/2000 | Moshfeghi et al. | 713/201 |
| 6,081,829 | * | 6/2000 | Sidana | 709/203 |
| 6,085,229 | * | 7/2000 | Newman et al. | 709/203 |
| 6,092,074 | * | 7/2000 | Rodkin et al. | 707/102 |
| 6,161,112 | * | 12/2000 | Cragun et al. | 707/501 |

OTHER PUBLICATIONS

Pending U. S. Patent application Ser. No. 09/144,786, filed Sep. 1, 1998, entitled "Method and Apparatus for Html Control".
Pending U. S. Patent application Ser. No. 09/144,655, filed Sep. 1, 1998, entitled "Method and Apparatus for Implementing a Web Page Diary".
Pending U. S. Patent application Ser. No. 09/144,793, filed Sep. 1, 1998, entitled "Method and Apparatus for Communicating with a Server".

* cited by examiner

Primary Examiner—Mark H. Rinehart
Assistant Examiner—Farzaneh Farahi
(74) Attorney, Agent, or Firm—Fenwick & West LLP

(57) ABSTRACT

A system enables a user to maintain a catalog of network objects of interest to the user. The system comprises a diary owner system, a diary server and content providers, each coupled to a computer network. Each content provider includes presentable objects, annotated universal addresses which identify the objects and have annotations for controlling aspects of the objects or addresses, and transfer scripts enabling the transfer of the annotated universal addresses to the diary server. The diary server maintains the annotated universal addresses and presentation context information for subsequent retrieval. Accordingly, a diary owner or other user can access the annotated universal addresses and presentation context information to present the diary. Since content providers generate the annotations within the annotated universal addresses, the content provider can control aspects of the objects from within the user's diary. Since the presentation context information is separated from the content, presentation context can easily be modified.

24 Claims, 16 Drawing Sheets

(AUA)

(Diary Applet)

(Add AUA)

Content Transfer

Content Transfer

SYSTEM AND METHOD FOR GENERATING, TRANSFERRING AND USING AN ANNOTATED UNIVERSAL ADDRESS

INCORPORATION BY REFERENCE TO COPENDING APPLICATION(S)

This application is related to the following applications, filed concurrently herewith, each of which is incorporated herein in its entirety.

1. U.S. patent application Ser. No. 09/144655, entitled "Method and Apparatus for Implementing a Web Page Diary" of Joannes van der Meer.

2. U.S. patent application Ser. No. 09/144786, entitled "Method and Apparatus for HTML Control" of Joannes van der Meer.

3. U.S. patent application Ser. No. 09/144793, entitled "Method and Apparatus for Communicating With a Server" of Joannes van der Meer.

BACKGROUND OF THE INVENTION

1. Field of the Invention

This invention relates generally to computer networks, and more particularly provides a system and method for generating, transferring and using annotated universal addresses which can be presented by multimedia presentation tools, including internet browsers.

2. Description of the Background Art

One of the latest means of communication to obtain truly widespread acceptance is the medium known as the Internet. A global network, connecting millions of computers, the Internet is rapidly becoming the 'ultimate' way of communication. Still, it has quite a few drawbacks. Some, like its speed (or lack thereof), are readily apparent to the regular user.

In real life, we (consciously or unconsciously) 'judge a book by its cover', i.e. we form an opinion about other people based on how they present themselves, through their style of clothing, the car they drive, their hobbies and interests, and the people they admire or detest. Users of the Internet find it virtually impossible to present themselves, other than through what they 'say' in email, on newsgroups, etc. Technical users have some ability to present themselves through their web sites. However, setting up and maintaining such a presence on the web requires talents from many different disciplines, including Computer Science, Human-Computer Interface design, graphic design, fine art, and writing. It is obvious from many examples available on the web today, that not all users have all of these skills in equal proportions. As such, the Internet is essentially a faceless medium, meaning you hardly know who you're dealing with.

In the real world, when we visit a place we like, we often take home some tangible memory of that place, like photographs or souvenirs. On the web, we don't really have that option. The only 'memories' we might have of where on the web we have been last week, are some rather inexpressive bookmarks that say "Welcome to the homepage of Some-Company" (or even worse: http://www.somecompany.com/). Such references give us no (sensory) clue whatsoever as to why we liked that particular place on the web, and whether or not we might like to visit again in the future. In this sense, our exploits on the web are rather volatile; i.e. we don't have anything 'tangible' by which to remember our travels.

SUMMARY OF THE INVENTION

The present invention provides a system and method for generating, transferring and using annotated universal addresses which can be presented by multimedia presentation tools, including internet browsers.

The system and method enable a user to maintain an ordered set of network object links (annotated universal addresses or AUAs) in an AUA database. The contents of the AUA database are presented to the user within a presentation context (e.g., template format). The system allows the user to select a different presentation context without effecting the contents of the AUA database. One of the types of presentation contexts is organized like a diary or agenda. Each context may include theme sections (e.g., car section, sport section, personal finance section, etc.) and sections per day. All of the sections optionally may be organized by time.

The system comprises a server which acts both as the AUA database server and as a presentation context server. Alternatively, this server may be divided into two separate servers. The system further includes an owner system and content providers. Each content provider includes descriptions of presentable objects, AUAs which identify the location of the objects (the universal address part of the AUA) and have annotations for controlling aspects of the objects. Each content provider also includes transfer scripts enabling the transfer of the AUAs to the AUA database server. The AUA database and presentation context server maintains the AUAs in a per user AUA database and maintains template formats (presentation contexts that are to be shared by all users that have selected the same presentation context for their AUA database) for subsequent retrieval. Accordingly, the AUA database owner or other user can access the AUAs and the template information to have the AUAs presented. Since content providers have defined the annotations within the AUA, the content provider controls certain aspects of the objects as they are presented to the owner and any other user.

One embodiment provides a method which includes the steps of receiving a request from a client for both an AUA database and an associated presentation context, identifying the template and AUA database corresponding to the request, the annotated universal address including a universal address identifying a location of an object and including an annotation for controlling an aspect of the object, and transmitting the format information and the annotated universal address to the client.

Another embodiment provides a method which includes the steps of requesting access to an AUA database on a server, receiving format information and an annotated universal address from the server, the annotated universal address including a universal address identifying a location of an object and including an annotation for controlling an aspect of the object, generating network data using the format information and the AUA, and retrieving the object specified by the universal address part of the AUA.

Yet another embodiment provides a method which includes the steps of specifying a universal address to identify a location of an object, generating an annotation for controlling an aspect of the object, associating the universal address with the annotation to generate an annotated universal address, associating a request interface with the annotated universal address, generating network data for presenting the object and the request interface, and enabling transfer of the annotated universal address upon receiving an indication at the request interface.

Still another embodiment provides a method which includes the steps of requesting addition of an annotated universal address to an AUA database. on a server, receiving a transfer script in response to the request, initiating execution of the transfer script to request a transfer applet from the server, and initiating execution of the transfer applet to transfer the annotated universal address to the AUA database on the server.

The system and method of the present invention may advantageously enable a user to maintain an AUA database and a presentation context associated with it. This enables a user to maintain for instance a more exciting catalog ("diary", "agenda" or any other presentation context) of web sites or objects available from the web sites. The system and method enable the diary owner to provide other user's with access to the owner's AUA database and presentation context. The system and method enable a diary owner to change formats among several available formats. The system and method enable a content provider to create AUAs for objects at his web site, to have these AUAs transferred from the web site by a user to the user's database, and to have a new access path to the object from within the presentation context associated with the user's database. The system and method advantageously enable a content provider to target more appropriate users with advertisements. The system and method enable a content provider to maintain some control of the objects displayed at the user's diary.

DETAILED DESCRIPTION OF THE PREFERRED EMBODIMENT

Figure 1:
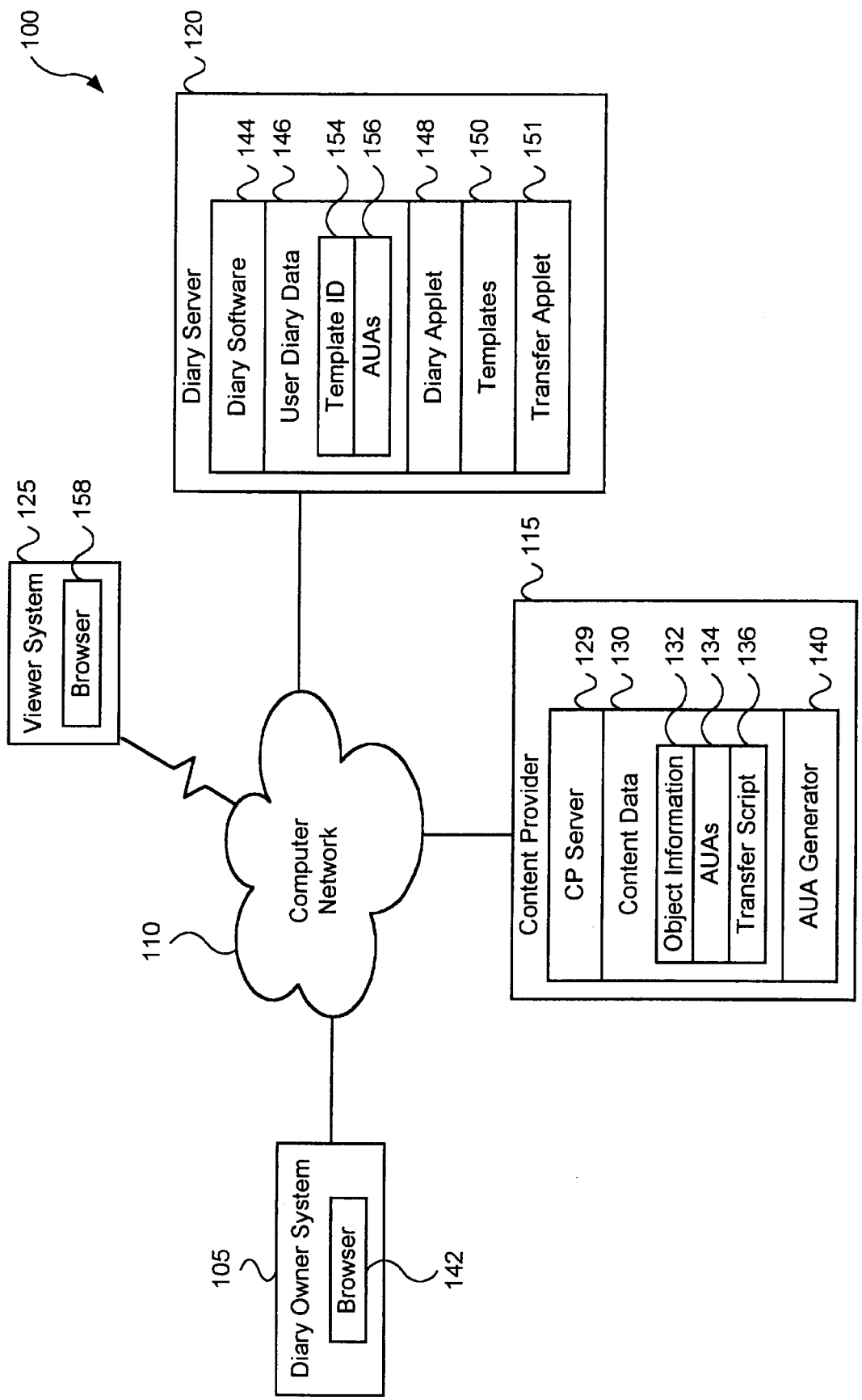
FIG. 1 is a block diagram illustrating a network system, in accordance with the present invention.

FIG. 1 is a block diagram illustrating an example network system 100 in accordance with the present invention. The network system 100 includes a diary owner system 105 coupled via a computer network 110, e.g., the Wide Area Network (WAN) commonly referred to as the Internet 110, to a content provider 115. A diary server 120 and a viewer system 125 are also coupled to the computer network 110. The diary owner 105 maintains a computer diary on the diary server 120. The content providers 115 use annotated universal addresses to control aspects of the diary content.

The content provider 115 is a computer system that stores content data 130 for browsers to use. The content data 130 includes object information 132, which may be an image, text, a movie, an applet, etc., or a link thereto, for browsers to present. It is intended herein that the term "presenting" cover displaying, performing, manipulating or other multimedia action performed by a browser. The content data 130 further includes annotated universal addresses (AUAs) 134 which both identify a universal address (URL) of the object information 132 and specify aspects of how the universal address or object information 132 should be handled by the diary server 120 or user. AUAs 134 will be described in greater detail with reference to FIG. 3. The content data 130 further includes a transfer script 136 that, when executed by the browser 142, enables the transfer of the an AUA 134 to the diary server 120. It will be appreciated that sending the AUA 134 to the diary server 120 enables the content provider 115 to control aspects of the resulting object as they are presented to the owner and any other user (in the presentation context specified by the template). The content provider 115 further includes a content provider (CP) server 129, which has a web server (not shown) for communicating with a browser, and includes an AUA generator 140 for generating the AUAs 134. The AUA generator 140 is described in greater detail with reference to FIG. 12. Alternative to an AUA generator 140 on the content provider, the AUA generator 140 may be stored on the diary server 120 and executed thereon.

The diary server 120 is a computer system which includes diary software 120, which has a web server (not shown) for communicating with a browser and with the content provider 115. The diary software 120 receives the AUAs 134 being transferred from the content provider 115, and stores them in an AUA database (labeled AUAs) 156 in user diary data 146. User diary data 146 also includes a template identification (ID) 154, which specifies a template 150 stored in the diary server 120. Each template 150 identifies a format for diary pages, and identifies objects (such as cartoon characters, company advertisements, etc.) to be presented on the diary pages. It will be appreciated that the templates 150 may alternatively be stored on a presentation context server (not shown) in communication with the diary server 120. For example, a template 150 may be created by a particular corporation wanting to advertise and thus offering a presentation context for a user to select. The template 150 may be stored on a presentation context server operated by the corporation and downloaded in accordance with the template ID 154 in the page definition. It will be appreciated that, although the embodiment is being described as using templates 150, any means for presenting data in a presentation context may be used. User diary data 146 is described in greater detail with reference to FIG. 13.

The diary server 120 further includes a diary applet 148, which may be downloaded via the computer network 110 to any browser for presenting the user diary data 146. The diary applet 148 is described in greater detail with reference to FIG. 4. Although the system 100 is being described with reference to Java applets, it will be appreciated that any executable or interpretable application code, which is downloaded from a source computer and run on a destination computer, may alternatively be used. Other downloadable code may include JavaScript™ scripts developed by Netscape Communication, Inc., ActiveX™ controls designed for use in the ActiveX™ distributing environment developed by the Microsoft Corporation, Visual Basic also developed by the Microsoft Corporation, plugins which add to the functionality of an already existing application program, etc. It will be further appreciated that one or more applets, one or more ActiveX controls, one or more plugins, etc. or combinations thereof may alternatively be used. The term "applet" is being used herein to include any downloadable code format.

The diary owner system 105 is a computer system which stores and operates a browser 142, such as the Netscape Navigator® browser by Netscape Corporation or the Internet Explorer® browser by Microsoft Corporation. To initiate a diary presentation context, the diary owner system 105 via the browser 142 contacts the diary server 120 to open a user database, and to select a template 150 (i.e., a presentation context or format). The diary software 144 (which may be implemented as one or more applets) allows the user to select a particular section, to browse through various sections, to show a particular AUA, etc. For each page, the diary software 144 generates a page definition using a network-based publishing language (NBPL) such as HTML and instructs the browser to present the page corresponding to the page definition to the user.

The diary owner system 105 via the browser 142 contacts a content provider 115 to view content data 130, or more particularly to view the object information 132. If the user of the diary owner system 105 decides that object information 132 is worthy of adding to the diary on the diary server 120, the user may provide an indication of interest to a request interface, e.g., by performing a mouse-down event while the mouse pointer is over a virtual button on the web page provided by the content provider 115. Accordingly, the content provider 115 transfers the AUAs 134 corresponding to the user's selection to the diary server 120. Since an applet is limited to setting up a communications link with only the originator of the applet, it will be appreciated that transferring the AUA 134 to the diary server 120 may include a level of indirection. That is, the content provider 115 via the CP server 129 may forward a transfer script 136 to the browser 142 on the diary owner system 105. The browser 142 executes the transfer script 136, which generates a request (e.g., a post request) for the diary server 120 to download a transfer applet 151. It will be appreciated that the request may be implemented by generating a web page containing the request. The transfer applet 151 can establish a communications link with the diary server 120 (for storage of the new AUAs, e.g., as part of a storage operation of the full user diary data 146) and can establish a communications link with the diary applet 148 on the diary owner system 105 to point out the newly added AUAs 156 (for immediate presentation at the diary owner system 105).

The diary owner system 105 via the browser 142 or the viewer system 125 via the browser 158 may contact the diary server 120 to request viewing particular user diary data 146. The diary software 144 uploads the user diary data 146, the diary applet 148 and the appropriate template 150 to the requesting browser 142, 158. The requesting browser 142, 158 executes the diary applet 148, which generates HTML data 'on the fly' from the template 150 and from the AUAs 156 contained in the requested user diary data 146. It will be appreciated that the diary server 120 enables the diary owner system 105 to select different templates 150 on the fly, so that a different diary formats can be used. Generating the HTML data from AUAs is described in greater detail with reference to FIG. 11.

Figure 13:
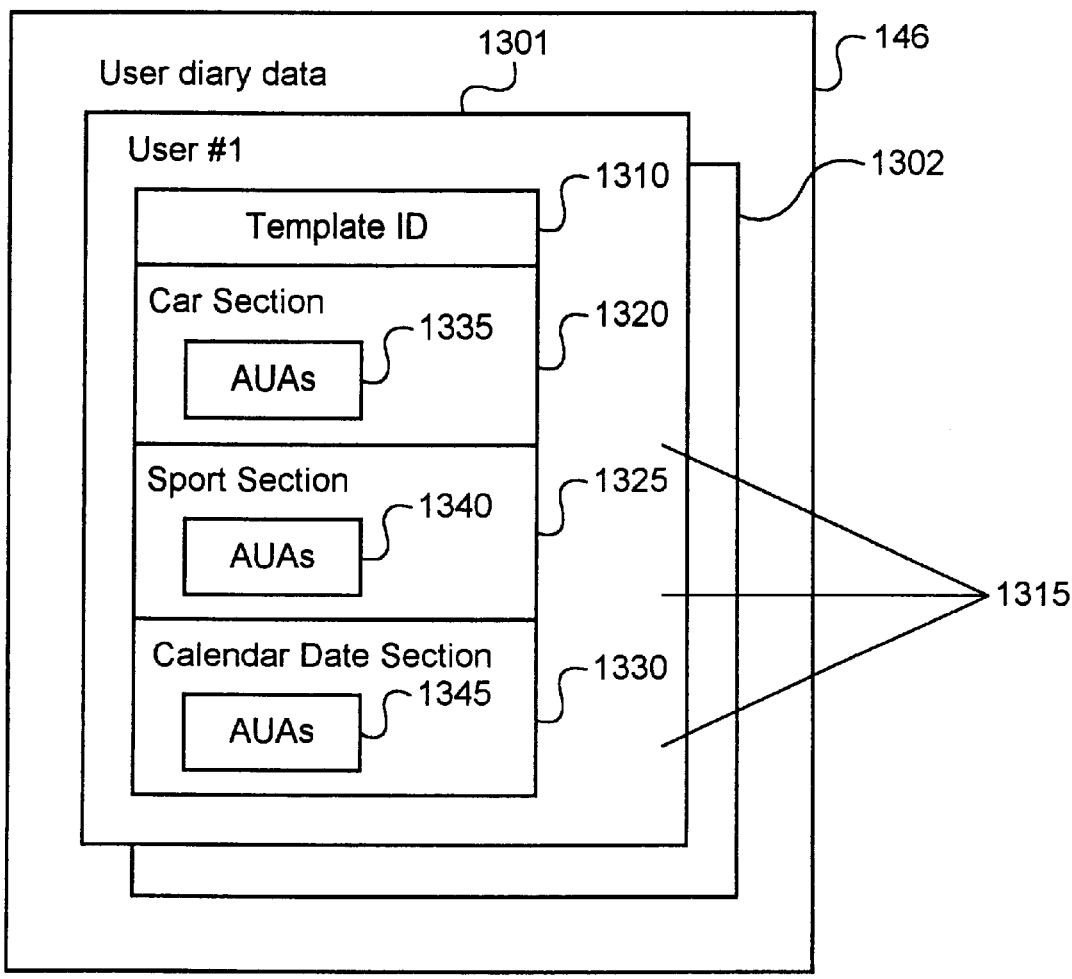
FIG. 13 is a block diagram illustrating details of user diary data.

Representative organization of the user diary data 146 is illustrated in and described with reference to FIG. 13. It will be further appreciated that the viewer system 125 exemplifies any system connected to the computer network 110 that includes a browser.

Figure 2:
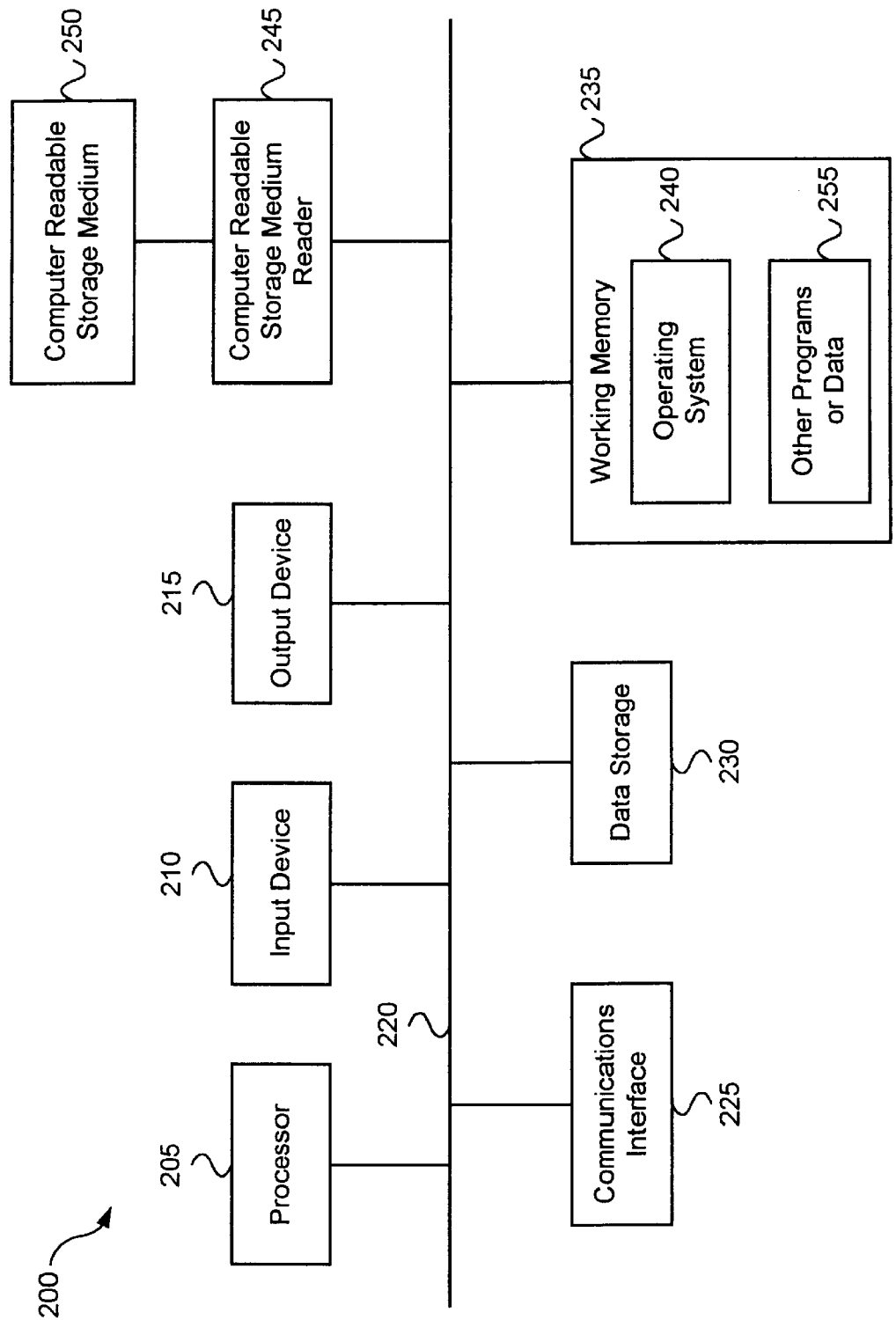
FIG. 2 is a block diagram illustrating a computer system of FIG. 1.

FIG. 2 is a block diagram illustrating a computer system 200 which illustrates details of each of the diary owner system 105, the content provider 115, the diary server 120 and the viewer system 125. The computer system 200 includes a processor 205, such as an Intel Pentium® microprocessor or a Motorola Power PC® microprocessor, coupled to a communications channel 220. The computer system 200 further includes an input device 210 such as a keyboard and mouse, an output device 215 such as a Cathode Ray Tube (CRT) display, a communications device 225, data storage 230 such as a magnetic disk, and working memory 235 such as Random-Access Memory (RAM), each coupled to the communications channel 120. The communications channel 220 is coupled to the computer network 110. One skilled in the art will recognize that, although the data storage 230 and working memory 235 are illustrated as separate units, data storage 230 and working memory can be integrated or partially integrated units.

An operating system 240 controls processing by the processor 205, and is typically stored in data storage 230 and loaded into working memory 235 (as illustrated) for execution. Other programs or data 255 such as browsers, servers, applets, scripts, content data, etc. may also be loaded into working memory 235 (as illustrated) for execution by processor 205. The programs or data 255 may be loaded via the communications interface 225 of via the data storage 230. One skilled in the art will also recognize that the programs or data 255 may be received by and stored in the system in alternative ways. For example, a computer-readable storage medium (CRSM) reader 245 such as a floppy disk drive, hard disk drive, CD-ROM reader, magneto-optical reader, CPU (for RAM), etc. may be coupled to the communications channel 220 for reading a computer-readable storage medium (CRSM) 250 such as a magnetic disk, a hard disk, a magneto-optical disk, RAM, etc. Accordingly, the system 200 may receive programs or data 255 via the CRSM reader 240.

One skilled in the art will recognize that the computer system 200 may also include additional information, such as network connections, additional memory, additional processors, LANs, input/output lines for transferring information across a hardware channel, the Internet or an Intranet, etc.

Figure 3:
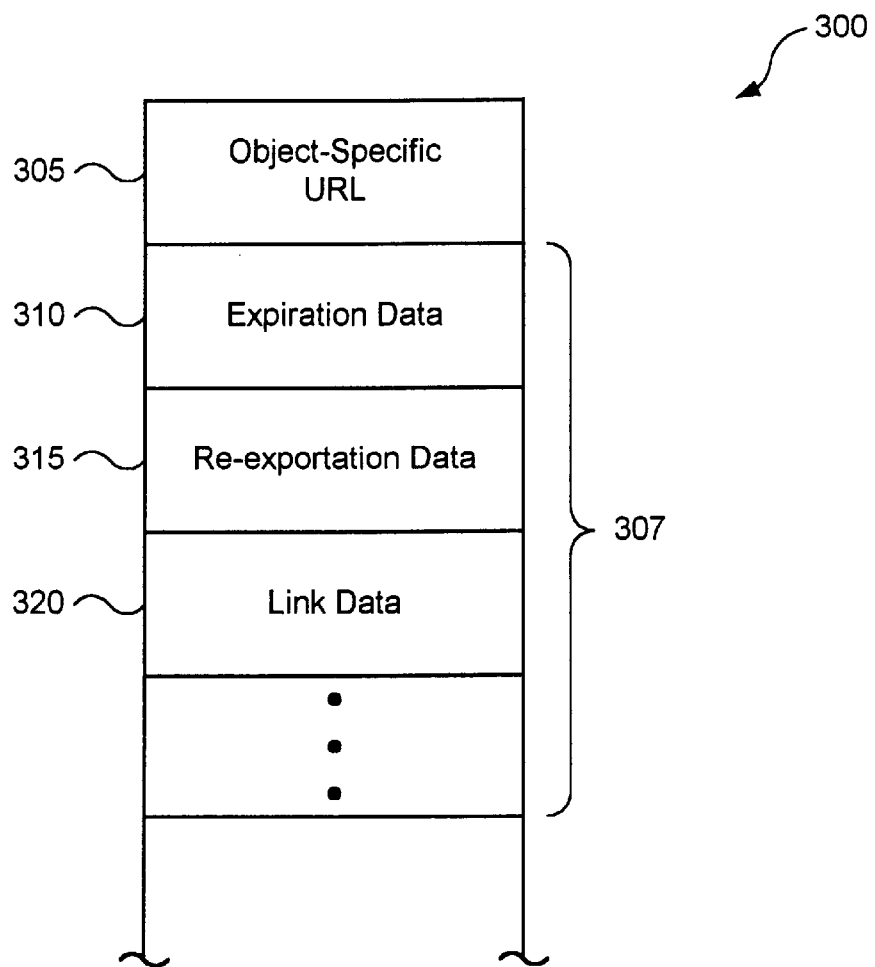
FIG. 3 is a block diagram illustrating details of an AUA of FIG. 1.

FIG. 3 is a block diagram illustrating details of an AUA 300, such as the AUA 134 stored on the content provider 115. The AUA 300 includes an object-specific universal address (e.g., a uniform resource locator or URL) 305, which identifies object information 132 such as an image, text, applet, etc. The AUA 300 further includes annotations 307, which indicate how to handle some aspect of the object information 132 or the universal address 305. The example annotations 307 listed include expiration data 310 defining the date which the content provider 115 no longer guarantees the existence of the object, re-exportation data 315 indicating whether the content provider 115 enables the diary applet 148 to export the AUA 156 from the diary server 120 exactly as the content provider 115 exported the AUA 134 in the first place, and link data 320 indicating a desired hypertext link. It will be appreciated that in order for the diary applet 148 to be able to re-export the AUA 156, the diary applet 148 should contain the same or similar transfer scripts as were part of the content provider 115 in transfer script 136 and should be able to display the same or similar request interface as the original content provider 115. It will be further appreciated that the link data 320 may include a link to an object or page which may be on a different site than the content provider site 115.

Other annotations 307 may include a suggested section in which to store the AUA 134 on the diary server 120, a natural size for the object, a description of the object, a privacy level, a type of object indicator, etc. It will be appreciated that the annotations 307 may override HTML default parameters. It will be further appreciated that the AUA 156 on the diary server 154 may have some differences from the corresponding AUA 134 on the content provider 115, such as the removal of the suggested section in which to store the AUA 134 after the AUA 134 has been stored in a section. It will be still further appreciated that the AUA 134 may include a field to indicate whether the AUA 134 is optional or to be presented based on certain criteria. For example, the AUA 134 may include a privacy level indicating that the AUA 134 should not be presented unless the user has the same privacy level or higher. The privacy level may be set by the content provider 115 or may be defined by the user based on a response to a query. As another example, the AUA 134 may include an optional field which enables the user to decide whether the AUA 134 is to be presented. That is, the diary applet 148 may ask, "Do you wish to see a picture of the car to win the latest race?" Presentation of the AUA 134 may be based on the response.

Figure 4:
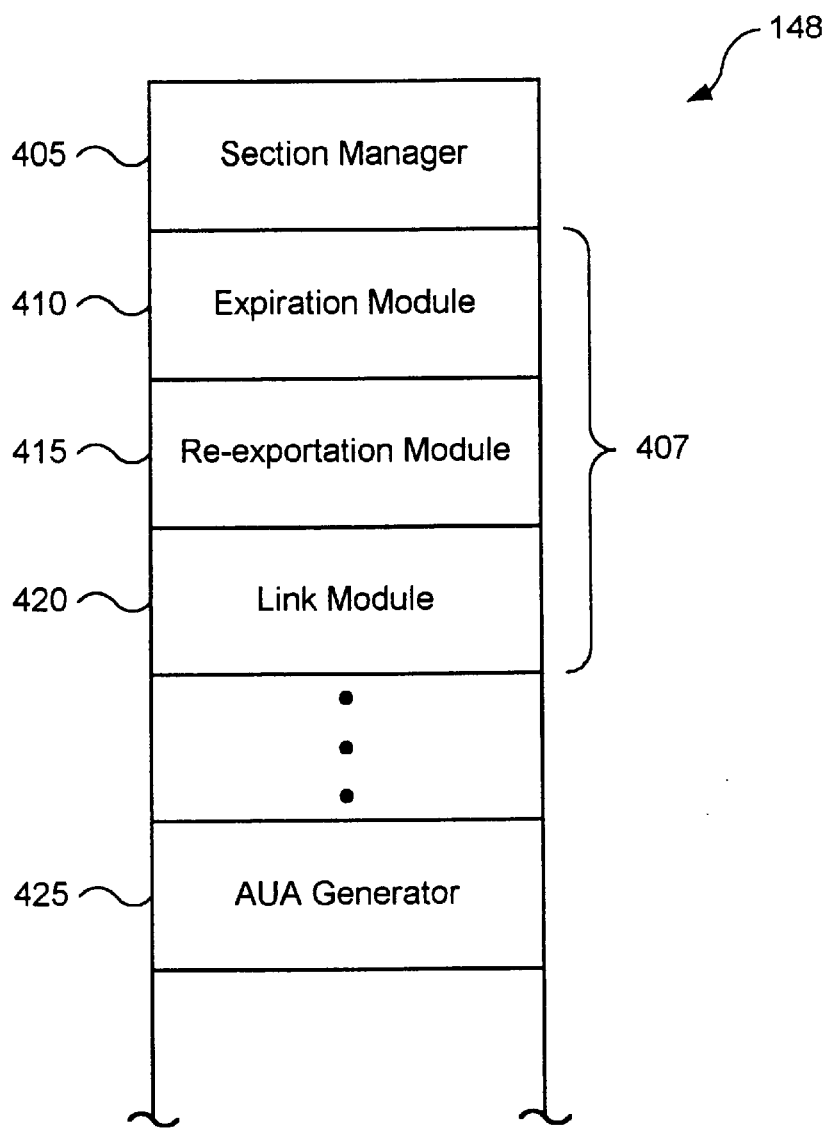
FIG. 4 is a block diagram illustrating details of the diary applet of FIG. 1.

FIG. 4 is a block diagram illustrating details of the diary applet 148, which includes code for generating web pages to present the user diary data 146. The diary applet 148 includes a section manager 405 for retrieving the template 150 (i.e., a presentation context) corresponding to the template ID for a section. It will be appreciated that the section manager 405 enables a user to select a section (e.g., the car section as illustrated in and described with reference to FIGS. 9 and 13 or a section for a given calendar date).

The section manager 405 initiates each of the modules 407 corresponding to the annotations 307 contained in the AUAs 156. That is, the expiration module 410 examines the expiration data 310 to determine if the AUA 156 has expired. If expired, then the expiration module 410 informs the section manager 405 to discard the AUA 156. The re-exportation module 415 examines the re-exportation data 315 to determine if the AUA 156 is to be exportable by a viewer, such as by the viewer system 125. If so, then the re-exportation module 415 sends data and/or code to the section manager 405 to enable re-exportation. The link module 420 examines the link data 320 to determine if any hypertext links are desired. If so, the link address is provided as a hypertext link or as another connection means. The link module 420 accordingly provides data and/or code to the section manager 405. Other modules for handling other annotations, such as natural size, description, privacy level, etc. may also be included.

The section manager 405 compiles the presentation context based on the template 150 and the currently selected section, the universal address parts of the AUAs 156 for the section and the information received from the modules 407 to generate an HTML page definition. The section manager 405 then instructs the browser 142, 158 to present the page corresponding to the page definition to the user. The browser 142, 158 downloads the object information 132 specified by the universal address parts of the AUAs 156.

Figure 14:
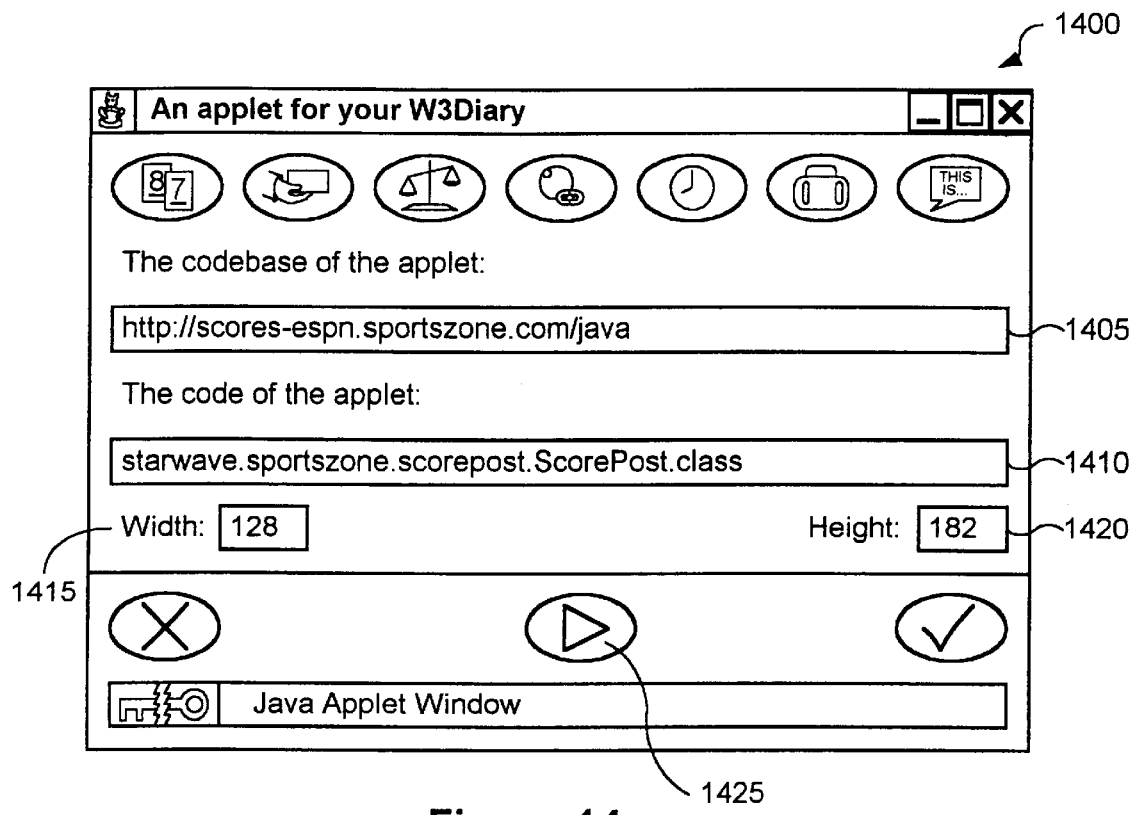
FIG. 14 illustrates a window enabling a diary owner system to input an object to be included in an annotated universal address.
Figure 15:
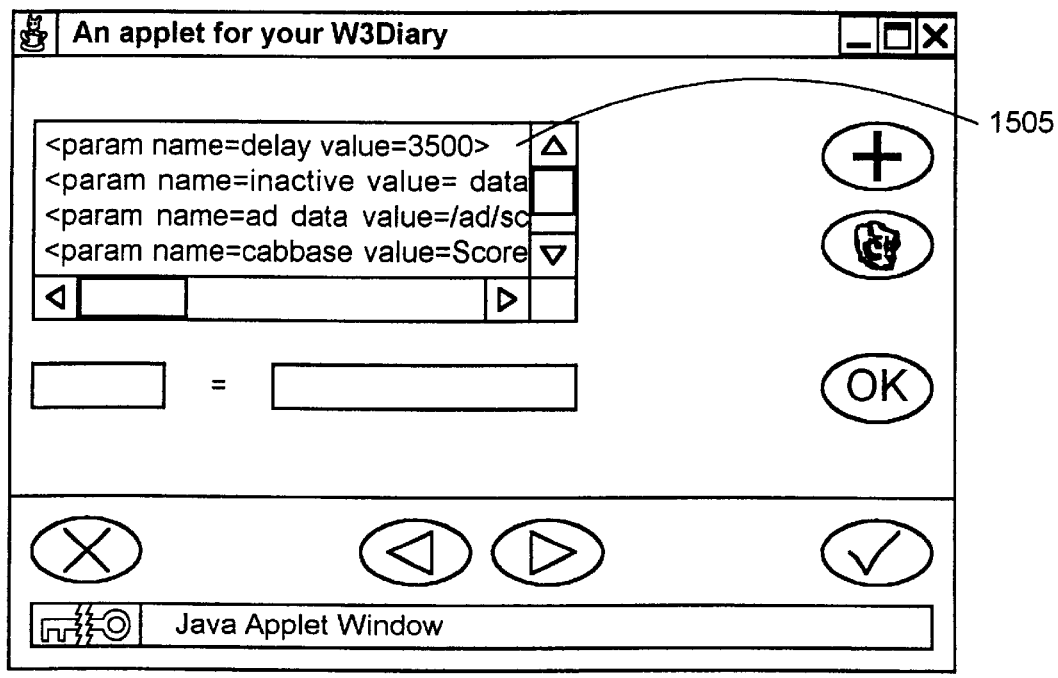
FIG. 15 illustrates a window enabling a diary owner to input annotations to be associated with the object and included in the annotated universal address.

The diary applet 148 optionally may include an AUA generator 425, similar to the AUA generator 140 of FIG. 1 and described in greater detail with reference to FIG. 12. The AUA generator 425 enables a diary owner system 105 to add AUAs that do not originate from the content provider 115 to the user diary data 146. FIG. 14 illustrates a window 1400 enabling a diary owner system 105 to input an object, such as text, an applet, an image, a movie, etc. into the system 105. Window 1400 includes a box 1405 for inputting the address identifying the codebase of the object (e.g., applet), and a box 1410 for inputting an address identifying the object code (e.g., the applet code). Window 1400 further includes box 1415 for inputting a width annotation and a box 1420 for inputting a height annotation. Button 1425 causes the window 1500 for inputting additional annotations of FIG. 15 to pop up. FIG. 15 illustrates a window 1500 enabling a diary owner system 105 to input annotations to be associated with the object added in FIG. 14. Window 1500 includes a box 1505 for inputting additional annotations to the annotated universal address. The diary owner system 105 can then transfer the generated AUA to user diary data 146 in a manner similar to that described herein with reference to the transfer script 136.

Figure 5:
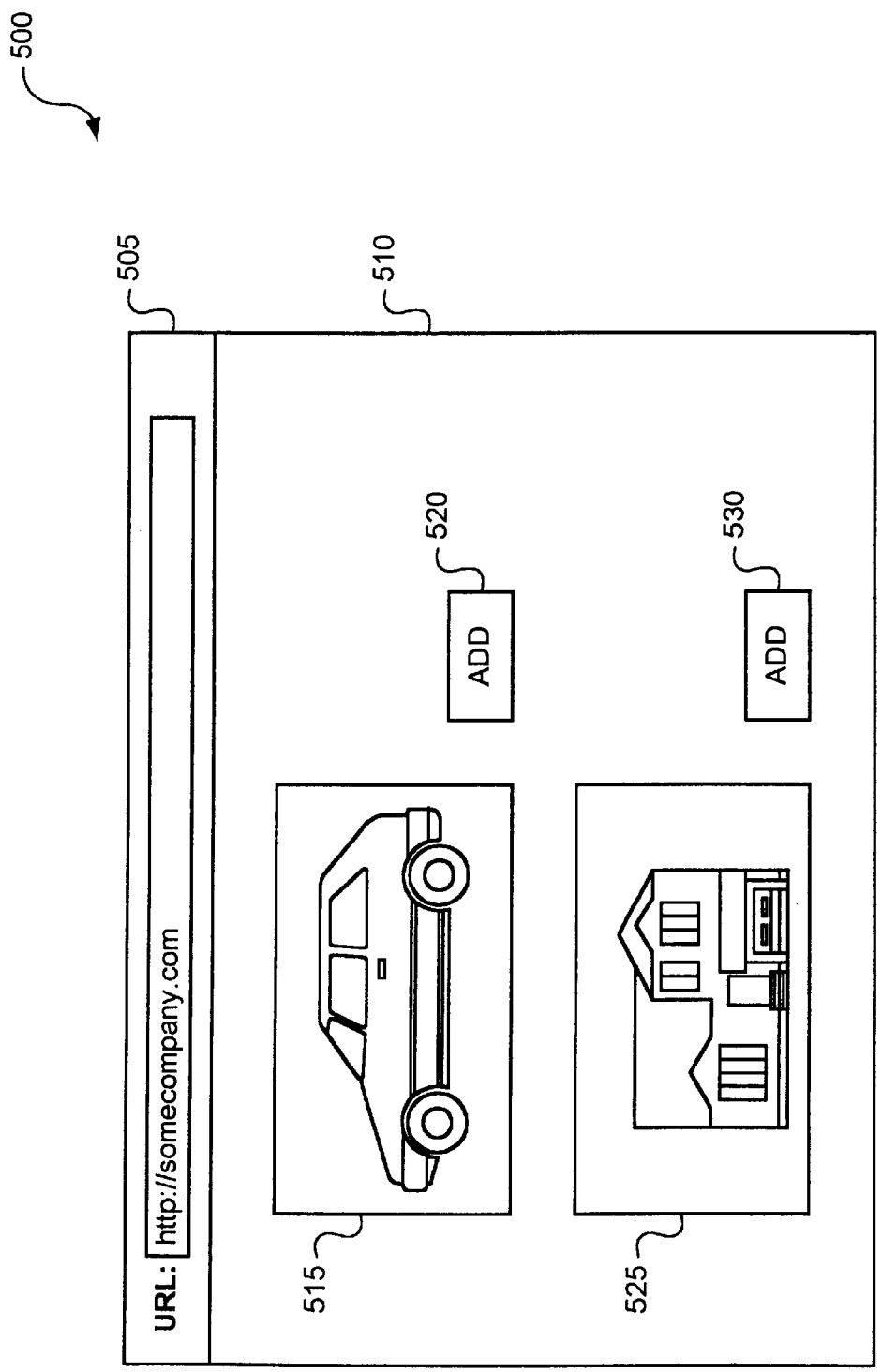
FIG. 5 illustrates an example web page provided by a content provider of FIG. 1.

FIG. 5 illustrates an example web page 500 provided by a content provider 115 implementing an embodiment of the present invention. In this example, the browser 142 displays the URL address (e.g., http://somecompany.com) of the content provider 115 in window portion 505 and displays the content data 130 in window portion 510. The example content data 130 of FIG. 5 includes a car object 515, a car "ADD" button 520, a house object 525 and a house "ADD" button 530. It will be appreciated that this content provider 115 may provide sales information for cars and homes. The diary owner 105 may want to add the car object 515 into the diary, and more particularly to a car section in user diary data 146. The owner is not aware that this will in fact transfer an AUA 134 that corresponds to the car object and that the AUA 134 contains a universal address and one or more annotations. Accordingly, the user via the browser 142 clicks on car ADD button 520, thereby initiating the transfer script 136.

Figure 6:
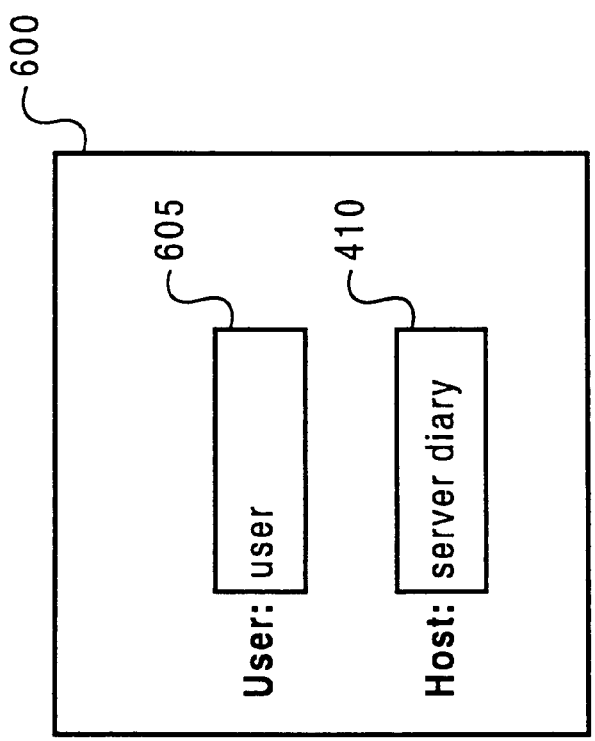
FIG. 6 illustrates a window requesting a diary server address for storing a requested AUA.

FIG. 6 illustrates a window 600 requesting a diary server 120 address at which to store the requested AUA 134. The window 600 includes an input box 605 for inputting the username of the diary user, and a host box 610 for inputting the network address of the diary server 120. The browser 142, executing the transfer script 136, uses the username and network address to transfer the requested AUAs 134 via the computer network 110 to the diary server 120. Any transfer mechanism may be used.

Figure 7:
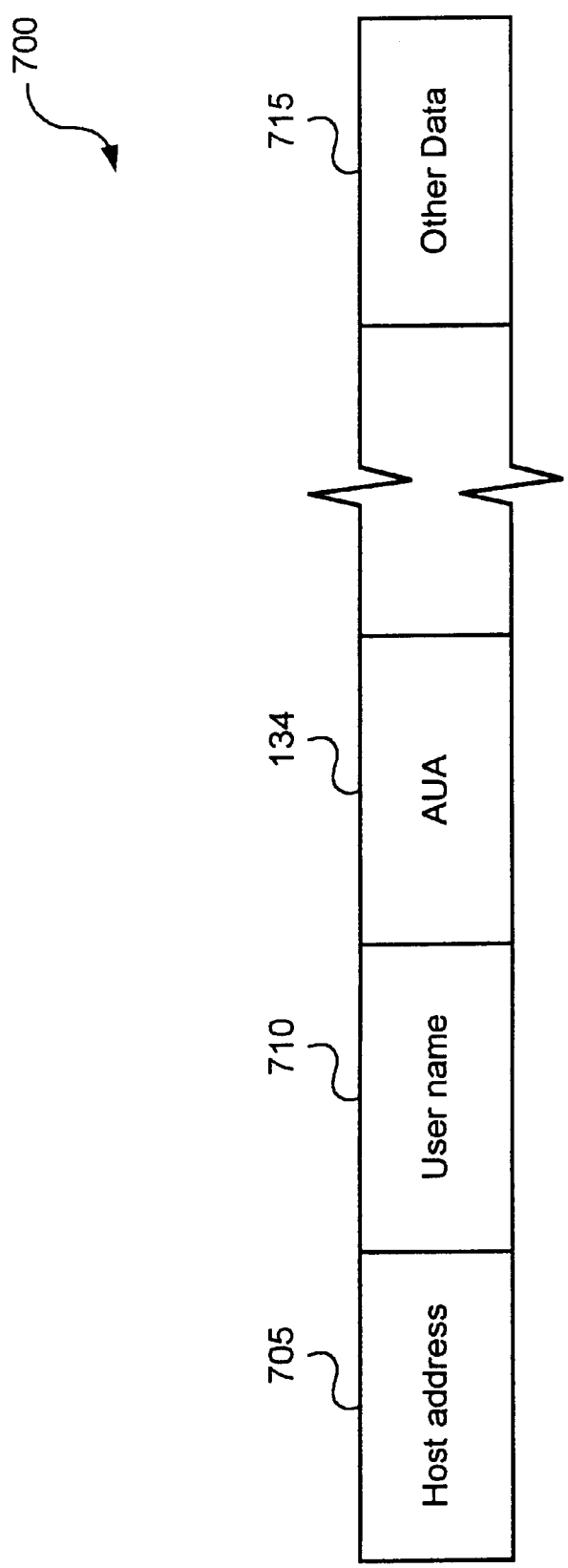
FIG. 7 is a block diagram illustrating a message packet created by the transfer script of FIG. 1.

FIG. 7 is a block diagram illustrating a message packet 700 created by the transfer script 136 for transmission to the diary server 120. The message packet 700 includes the host address received in host box 610, the username 710 received in user box 605, the requested AUA 134 and other data 715 used for network transfer. The browser 142 establishes a communications link with the diary server 120, and forwards the message packet 700 to the diary server 120.

Figure 8:
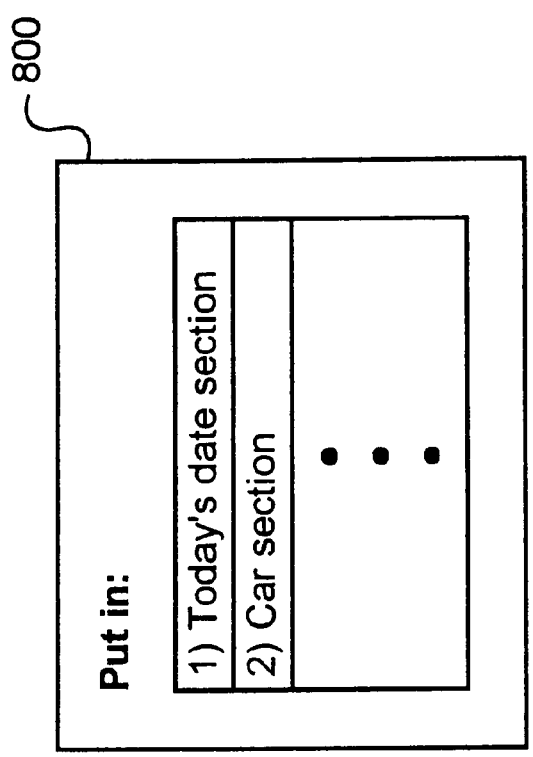
FIG. 8 illustrates a window requesting the section name in which to store A received AUA.

FIG. 8 illustrates a window 800 requesting the section name in which to store the received AUA 134. That is, the transfer applet 151 delivers the message packet 700 from the browser 142 on the diary owner system 105 to a particular AUA database within the user diary store 146. The transfer applet 151 retrieves the section names identifying the sections created for this user, and if requested by the AUA 134 offers the suggested section name as an option. It will be appreciated that, to offer the suggested section, the transfer applet 151 itself must include a suggested section module (not shown) similar to the modules 307. The suggested section module would determine whether the AUA 134 includes suggested section data and how to handle the suggested section data whether the option is selected or not. The browser 142 and diary software 144 enable the selection of a section. In this example, the browser 142 and transfer applet 151 enable the selection of a previously created car section or a default created today's date section.

Figure 9:
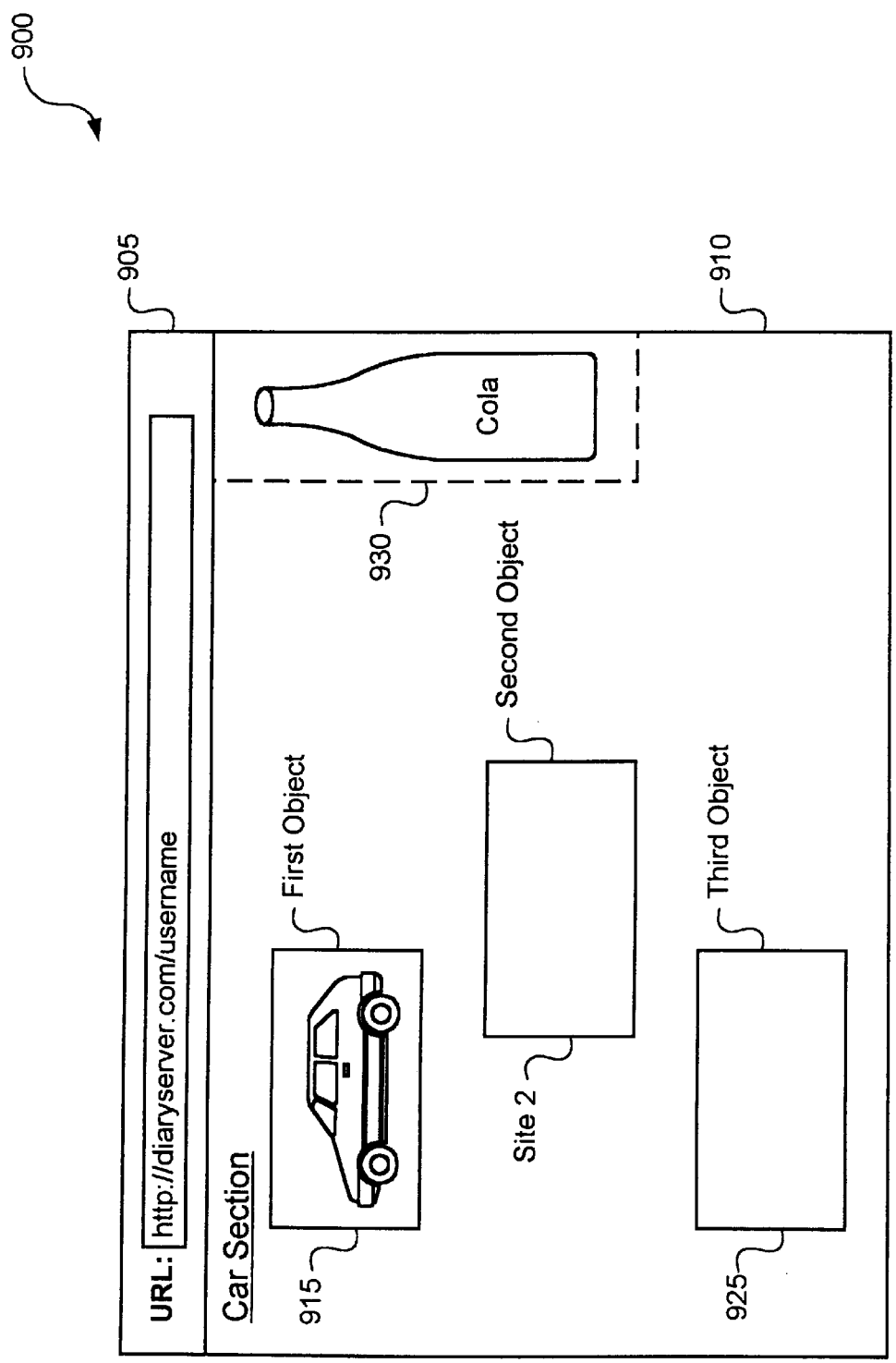
FIG. 9 illustrates a window of the car section of user diary data.

FIG. 9 illustrates a page of the car section 900 of user diary data 146. The URL address ("http://diaryserver.com/username) is shown in a window portion 905 and the car section of user diary data 146 is shown in object window 910. In this example, object window 910 displays a first object 915 (which may be the object 515 added from the content provider 115 example of FIG. 5). Object window 910 may include other objects, such as a second object 920 and a third object 925. The second object 920 may be, for example, an object from a blue book provider and the third object 925 may be, for example, an object from a particular car dealer. It will be appreciated that the car section 900 may also display an advertisement (e.g., a cola drink) in an advertisement window portion 930 generated by the template 150. That is, the sponsor of the particular template 150 for this section may have built a link to an advertisement into the template 150.

Generally, the section manager 405 of the diary applet 148 retrieves the selected template 150, which in this case includes a diagonal pattern of object locations. The section manager 405 of the diary applet 148 retrieves the first AUA 156 for the first object location. In this case, the first AUA 156 identifies the car object 515. The expiration module 410 determines that the object has not expired.

Thus, the section manager 405 creates HTML data for instructing the browser 145 to download from the content provider 115 the object information 132 located at the object-specific URL 305. It will be appreciated that the specific image defined by the object information 132 may have changed since the request to add the object to the diary server 120 took place. Accordingly, the content provider 115 can modify each day's, week's, etc. object. This will be appreciated for instance in cases where the object corresponds to an advertisement or a cartoon. The other annotation modules 407 review the annotations 307 contained in the AUA 156, and provide results to the section manager 405. Based on the object information 132, the template 150 (including any permanent or linked advertisements) and the results, the section manager 405 constructs the network-based publishing language (NBPL) page definition such as an HTML page definition containing object-specific URLs 305 for the browser 142 or 158 to use. The diary applet 148 repeats the process for each of the AUAs 156, and stacks them accordingly into the object locations of the template 150. The section manager 405 then instructs the browser 142 to present the page (corresponding to the page definition) to the user. Generating a section window 900 is described in greater detail with reference to FIG. 11.

Figure 10:
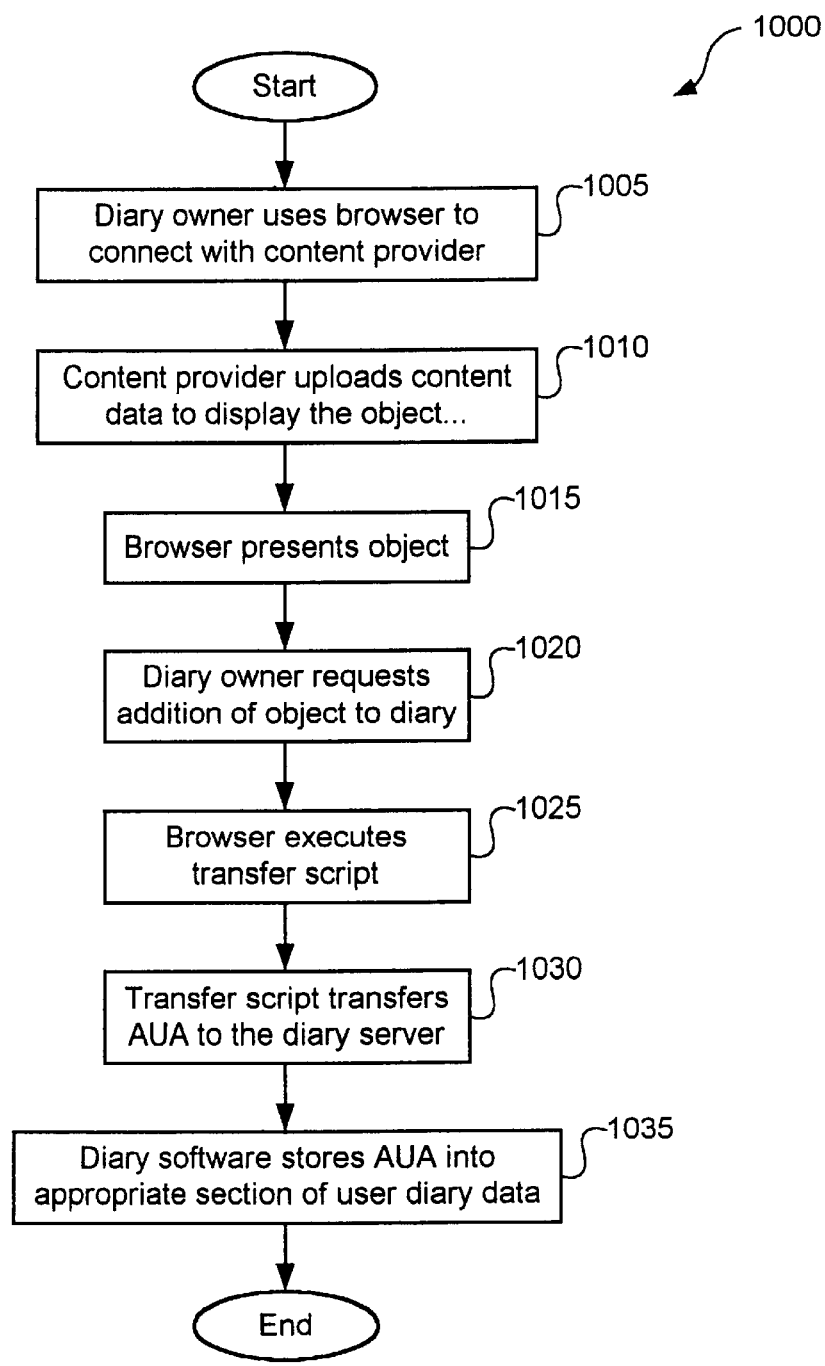
FIG. 10 is a flowchart illustrating a method of adding an AUA to the diary server, in accordance with the present invention.

FIG. 10 is a flowchart illustrating a method 1000 of adding an AUA 134 to the diary server 120. The method 1000 begins with the diary owner system 105 in step 1005 using the browser 142 to establish a communications link with the content provider 115. The content provider 115 in step 1010 uploads the content data 130 to the browser 142, which in step 1015 presents the object. It will be appreciated that the step of presenting may include the step of displaying, the step of performing, the step of manipulating, or like browser action. The diary owner 105 in step 1020 requests the addition of the object to the diary server 120. That is, the user performs an action such as a mouse down event over a button to indicate a desire to add an object link to user diary data 146. The browser 142 in step 1025 recognizes the action and initiates execution of the transfer script 136. The transfer script 136 and transfer applet 151 in step 1030 transfer the AUA 134 to the diary server 120. Step 1030 may include the steps of requesting the diary server 120 address, requesting the user's username, requesting a section name, and transmitting a message packet 700 which includes the diary server address, the username and the AUA 134 to the diary server 120. The transfer applet 151 in step 1035 stores the AUA 134 into the appropriate section of user diary data 146. Step 1035 may include the step of querying the user to select a previously created or preferred section. Method 1000 then ends.

Figure 11:
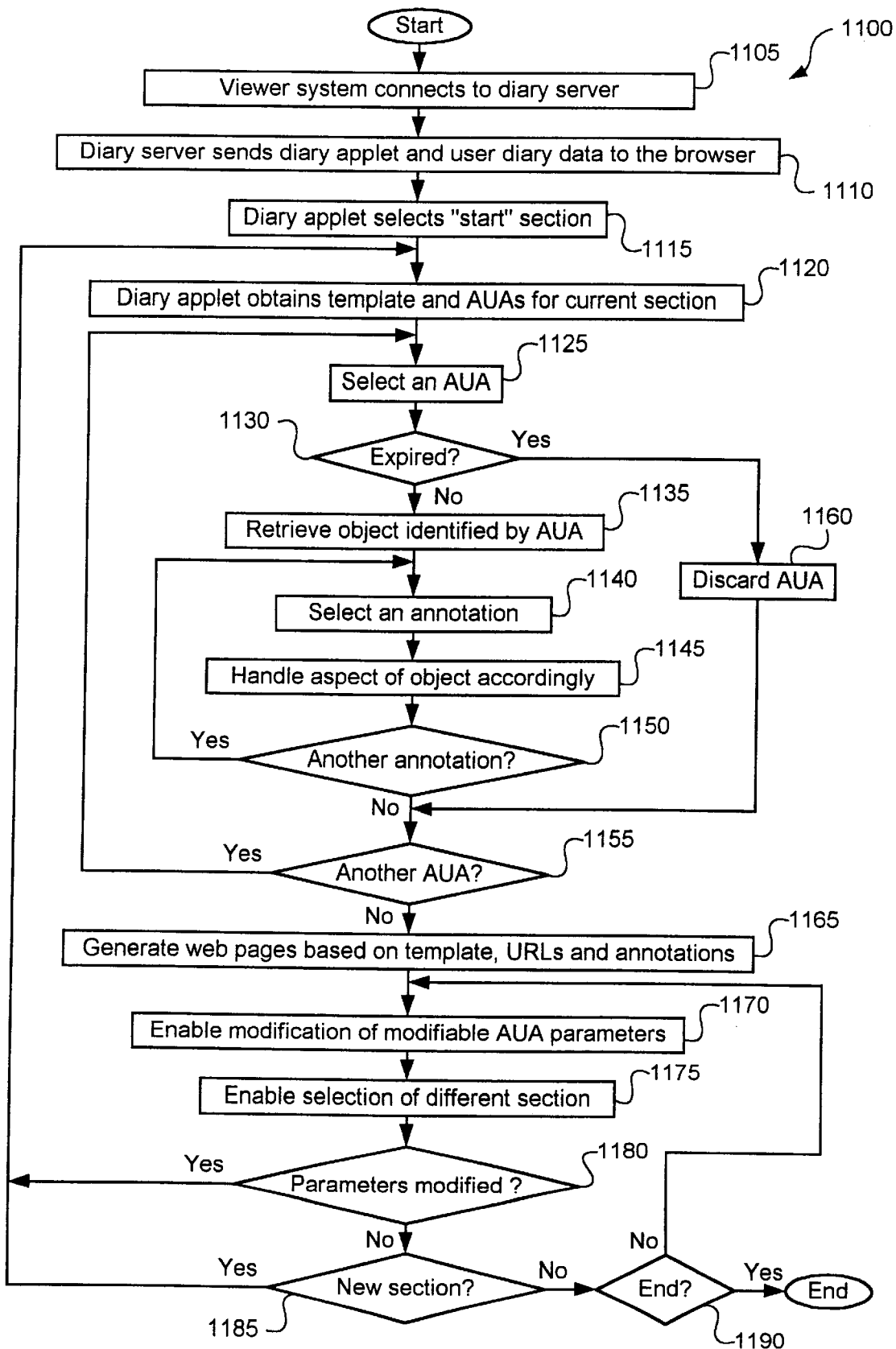
FIG. 11 is a flowchart illustrating a method of using AUAs to generate diary web pages for a section.

FIG. 11 is a flowchart illustrating a method 1100 of using AUAs 156 to generate diary web pages. Method 1100 begins with the browser 158 on the viewer system 125 in step 1105 establishing a communications link with the diary software 144 on the diary server 120. The diary software 144 of the diary server 120 in step 1110 sends a diary applet 148 and user diary data 146 to the browser 158. The section manager 405 of the diary applet 148, being executed by the browser 158, in step 1115 selects a default "start" section, e.g., the car section. The section manager 405 in step 1120 obtains the template 150 and the AUAs 156 for the current section. FIG. 13 is a block diagram illustrating details of user diary data 146. As shown, the user diary data 146 is divided into user-specific databases, namely, database 1301 for user #1 and other database 1302 for the other users. The database 1301 for user #1 includes a template ID 1310 and an AUA database 1315. The AUA database 1315 includes a car section 1320 which contains AUAs 1335, a sport section 1325 which contains AUAs 1340 and a calendar date section 1330 which contains AUAs 1345. Thus, the section manager 405 can retrieve the appropriate template ID and AUAs easily.

The section manager 405 in step 1125 selects a first AUA 156. Assuming that the AUA 156 has expiration data, the expiration module 410 of the diary applet 148 in step 1130 determines if the AUA 156 has expired. If expired, the expiration module 410 instructs the section manager 405 in step 1160 to discard the AUA 156. Alternatively, the section manager 405 in step 1160 can replace the expired AUA 156 with a new object that does not correspond to the expired AUA 156. Method 1100 then jumps to step 1155. Otherwise, the section manager 405 in step 1135 retrieves the object information 132 specified by the object-specific URL 305 in the AUA 156. The section manager 405 in step 1140 selects a first annotation 307. The section manager 405 in step 1145 instructs the appropriate module 407 to handle the aspect of the object accordingly. For example, if the first annotation 307 identified that re-exportation of the AUA 156 is allowed, then the re-exportation module 415 sends a re-exportation button and a corresponding script to the section manager 405. The section manager 405 in step 1150 determines if the AUA 156 includes another annotation to examine. If so, then method 1100 returns to step 1140. Otherwise, method 1100 proceeds with step 1155.

In step 1155, the section manager 405 determines if there is another AUA 156 to examine in this section. If so, then method 1100 returns to step 1125. Otherwise, the section manager 405 in step 1165 generate page definitions for the section based on the template 150, the universal addresses (URLs) and the annotations (i.e., the results of the examinations performed by the modules 407). Step 1165 further includes the step of instructing the browser 142, 158 to generate web pages based on the page definitions (which includes downloading the objects identified by the universal addresses in the page definitions).

The section manager 405 in step 1170 enables the modification of modifiable AUA parameters (not shown) such as privacy levels. The section manager 405 in step 1175 enables selection of a different section. If the section manager 405 in step 1180 determines that parameters have been modified, then the method 1100 returns to step 1120 to generate the web pages based on the new parameters. Similarly, if the section manager 405 in step 1185 determines that the user has selected a new section, then the method 1100 returns to step 1120 to generate the web pages based on the new section. If nothing has been modified (step 1180) or selected (step 1185), then the section manager 405 in step 1190 determines if the user has requested logout. If not, then method 1100 returns to step 1170. Otherwise, method 1100 ends.

Figure 12:
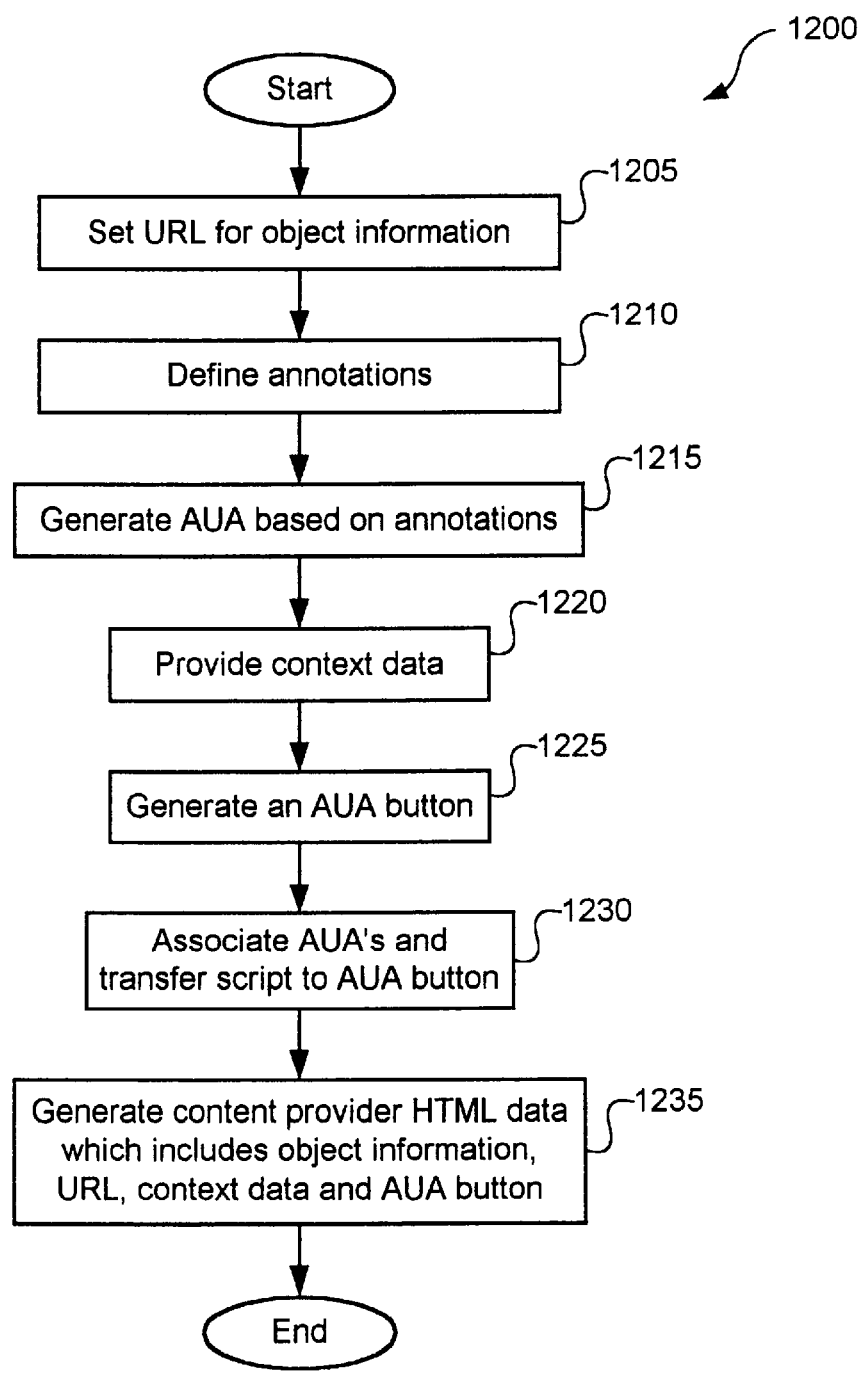
FIG. 12 is a flowchart illustrating a method of generating an AUA.

FIG. 12 is a flowchart illustrating a method 1200 for generating an AUA 134 and for placing the AUA 134 and transfer script 136 in a content provider page. Method 1200 begins with the AUA generator 140 in step 1205 setting an object-specific universal address or URL 305 for particular object information 132. The object information associated with the URL 305 may be an image, text, an applet, a movie, etc. The AUA generator 140 in step 1210 enables the content provider 115 to define annotations 307, e.g., the expiration data 310, the re-exportation data 315, the link data 320, etc. The AUA generator 140 in step 1215 generates an AUA 134 based on the object-specific URL 305 and the annotations 307. An example AUA 134 is shown in FIG. 3.

The AUA generator 140 in step 1220 provides context data in which the object information 132 will reside. For example, if the object information 132 defines a picture of a car, the context data may include text that explains the picture or other context data. The AUA generator 140 in step 1225 generates a AUA button, such as the ADD buttons 520 and 530 illustrated in and described with reference to FIG. 5. Although method 1100 is being described with reference to buttons, one skilled in the art will recognize that any request interface such as a pull-down menu, keyboard entry, mouse event, etc. may alternatively be used. The AUA generator 140 in step 1230 associates the AUA 135 generated in step 1215 with the AUA button generated in step 1225. It will be appreciated that one or more AUAs 134 may be associated with an AUA button. The AUA generator 140 in step 1235 generates a content provider HTML data which includes the object information 132, the URL, the context data and the AUA button. It will be appreciated that, when a user via a browser 142 contacts the content provider 115, the content provider 115 downloads the content provider HTML data. It will be further appreciated that the browser 142 uses the HTML data to generate a content provider web page, as illustrated in FIG. 5. Method 1200 then ends.

It should be understood that, although the following example is described in terms of a transfer function for a diary, the transfer function described can be used in any circumstances where a first machine (such as system 106) sends data (e.g., third party content) to a second machine (such as system 102), and the data then needs to be send to a third machine (such as system 104) under control of an applet executing in a browser on the second system. The present invention is contemplated to be of use in non-diary applications, as well as in diary applications.

Figure 16:
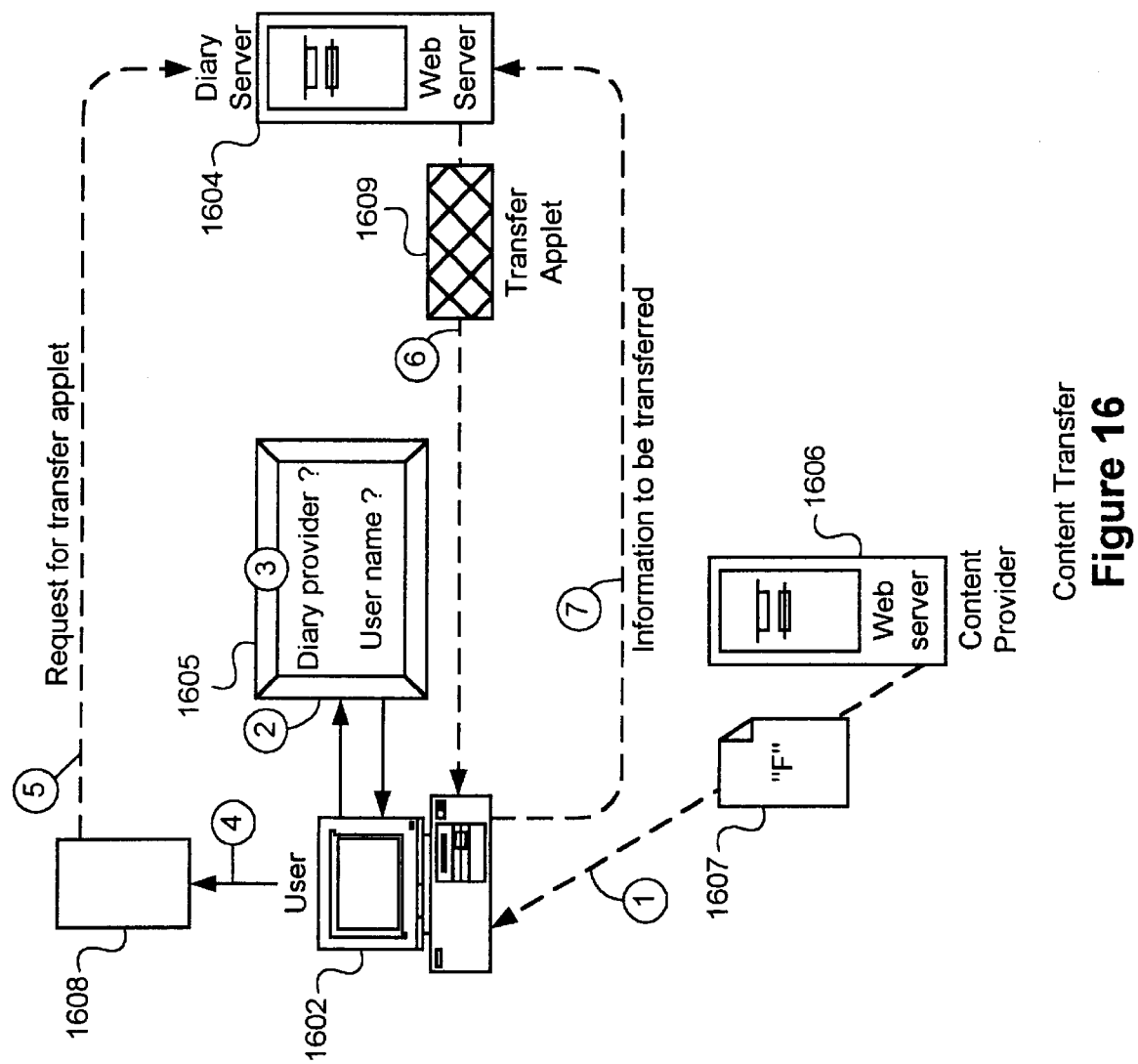
FIG. 16 is a block diagram illustrating transfer operations in a first embodiment.
Figure 17:
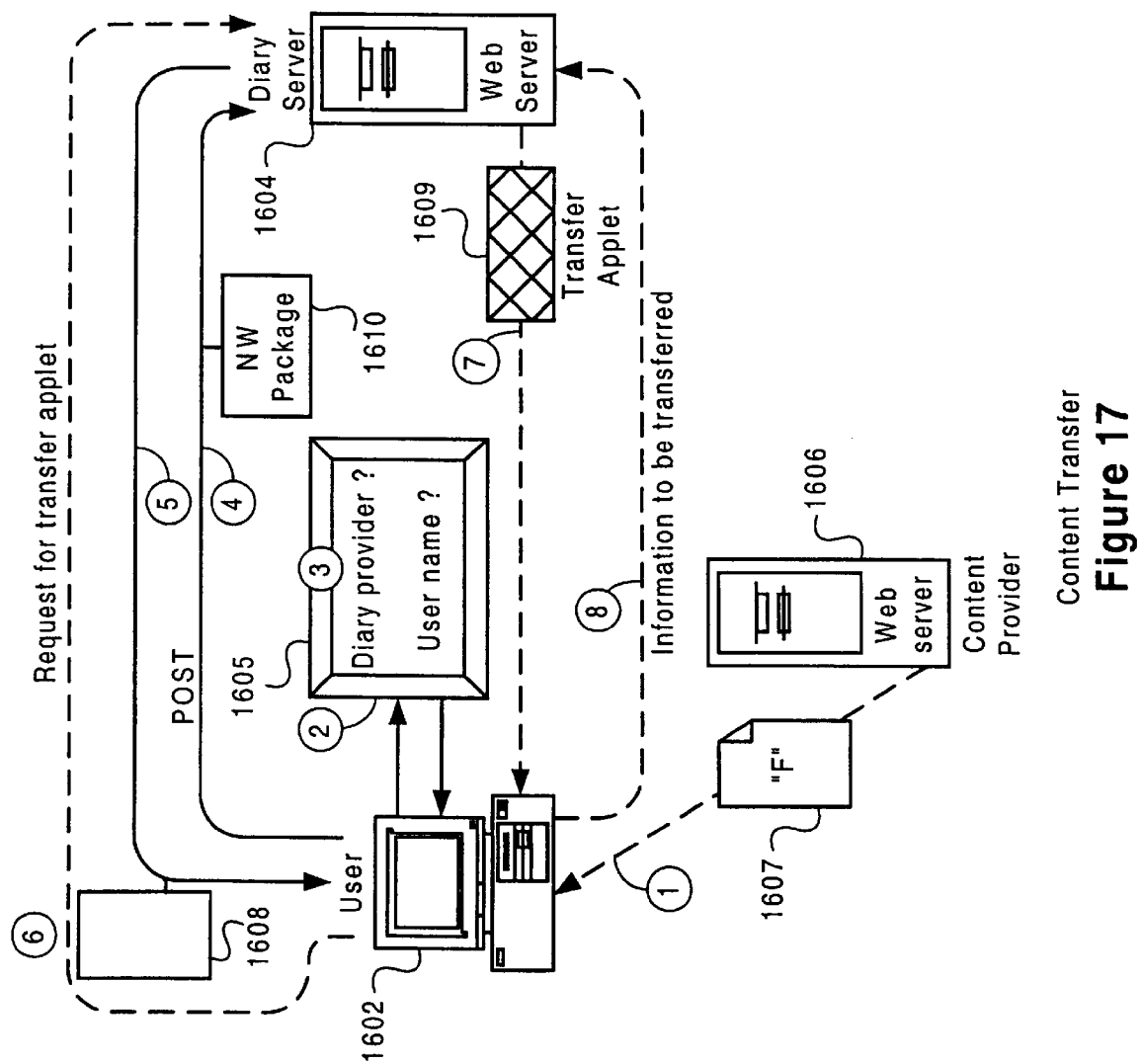
FIG. 17 is a block diagram illustrating transfer operations in a second embodiment.

FIG. 16 shows an overview of a first embodiment of a data transfer function involving three machines. FIG. 17 shows an overview of a second embodiment of a data transfer function, also involving three machines. FIG. 16 will be discussed first. In step 1 of FIG. 16, the user system 1602 loads the content provider's HTML page from the content provider 1606. This HTML page includes a function "F" 1607 that can be activated by the user via the HTML page (for example, clicking on a "add" button on the page). The user looks at the content provider's page (as displayed by the browser) and determines whether there is any third party content on the page available for his diary that he wants to add to his diary. If so, the user so indicates. For example, in the described embodiment, the user clicks on an "add" button 520 on the HTML page (see FIG. 5) associated with the desired third-party content. Clicking on this content activates function "F" 1607 within the displayed web page, as shown in step 2 of FIG. 16. In the described embodiment, function "F" is in JavaScript, but it can be any appropriate form of executable program.

As shown in step 2 of FIG. 16, the function "F" pops up a window 1605 that asks the user for his name and for the location of the diary server 1604 (step 3). Function "F" needs the name/exact location of diary server 1604 so that he can generate HTML page 1608 (step 4) that requests the transfer applet 1609 from the correct diary server 1604. (Note that certain embodiments can have more than one diary server 1604).

In step 4, the function "F" also generates HTML 1608 that contains:

1) activation of a transfer applet (to be loaded from the diary server 1604) (step 4 and 5), and
2) the parameters of the transfer applet containing all information about the provided content.

Thus, function "F" knows how to generate the HTML to activate the transfer applet (at the host stored by the user) with the parameters of the information to store In step 5, function "F" instructs the user 1602, i.e., the browser thereon, to load the HTML page 1608 in a new HTML-browser window. By loading that page 1608, the browser will load and execute the transfer applet 1609 on system 1602 (step 6). When transfer applet 1609 executes, it transfers data to system 1604. The function "F" uses a priori knowledge about the name/exact location of the transfer applet on diary server 1604. Similarly, function "F" uses a priori knowledge about the names and semantics of the parameters required by the transfer applet 1609.

It is important to note that, due to a security restrictions common to many implementations of execution environments of programs such as Java applets, transferring data between three machines (1602, 1604, 1606) is problematic. Because the data eventually has to be stored on system 1604, because communication may have been to be set up with the diary applet already running on the system 1602, and because the diary applet was loaded from system 1604, the transfer applet 1609 also must be loaded from system 1604. The problem is how to get the information describing the content provided to the transfer applet 1609 if the transfer applet is to be loaded from server 1604. For instance, the transfer applet 1609 is not allowed to connect to the content provider system 1606. The problem is solved by generating the HTML page 1608, which contains the instructions that activate the transfer applet 1609 in combination with all information about the content provided that should be handled by the transfer applet 1609. In other words, the HTML page 1608 is self-contained and the transfer applet 1609 activated by it can handle the transfer without any other communication other than with its source system 1604, which is allowed since it was loaded from system

1604. Thus, the method shown in FIG. 16 solves the problem caused by the security restraints of the execution environment.

In at least one embodiment, the database is not really transferred immediately, but is only scheduled for storage. A running diary applet performs the actual storage. If there is no running diary applet in the browser on the user system 1602, the transfer applet will start one. Similarly, in at least one embodiment, all applets store to a "store queue." This way, the transfer applet 1609 can insert a database in the queue that will be processed by another diary applet. Sharing of the new content (as transferred by the transfer applet) with the diary applet is extremely important because the new content will have to be made visible by the diary applet immediately and efficiently, e.g., it would not be acceptable to if it would require a user action in order to view the new content. Similarly, it would not be acceptable if it would require a full "re-upload" of the diary information by the diary applet in order to view the new content. The underlying fundamental mechanism on which the sharing has been based is the sharing of class variables in a single Java virtual machine.

This document includes a JavaScript that performs the function of function "F" of FIG. 17.

FIG. 17 shows an alternate embodiment of a transfer function in which the function "F" does not have a priori knowledge about the name/exact location of the transfer applet 1609. It can be advantageous to have function "F" not know the name/exact location of the transfer applet. Because there are many function "F"s in the network—each content provider 1606 has HTML containing a version of function "F"—it can be problematic if the diary server 1604 decides to change the name of the transfer applet 1609. If each function "F" (which resides on the content provider(s) 1606) knows the name of the transfer applet 1609, each function "F" would have to be changed if the name/location of the transfer applet 1609 is changed. If the function "F" does not know this information, function "F" does not have to change if the name of the transfer applet 1609 stored on system 1604 changes.

In FIG. 17, function "F" (received from system 1606) pops up window 1605 as described above and creates a "network package" 1610 that contains at least:

the name of the server 1604;

the name of the user; and the properties of the content to be transferred.

Network package 1610 is POSTed to diary server 1604. Diary server 1604 builds the page 1608 using the information in the network package 1610 and returns it to function "F" in system 1602. Function "F" continues as in FIG. 16. Specifically, function "F" instructs the browser thereon to load the HTML page 1608 in a new HTML-browser window. From this point onwards, the embodiment of FIG. 17 behaves as the embodiment of FIG. 16.

It will be appreciated that in this embodiment, the a priori knowledge of function "F" is limited to only the way the network package 1610 is to be structured, the content that is to be put into network package 1610, and the way this package 1610 is to be sent to diary server 1604. The amount of knowledge required is less than the knowledge required to generate page 1610 itself (as it does in the embodiment of FIG. 16).

It will be appreciated that the embodiment of FIG. 17 limits the "outer world" restrictions on the interface of diary server 1604. Once the diary server 1604 is in operation (as illustrated in FIG. 17), it should always support the handling of network packages 1610. However, the internals of page 1608 may be changed by the diary server 1604 whenever such a change is required. Note that such a change is not an option in the embodiment of FIG. 16, since the a priori knowledge about the contents of page 1608 have been spread over numerous content provider systems 1606.

The destination section of each entry in the current transfer may be changed by selecting the entry and then selecting a section. That is, the transfer applet 1609 will pop up a window as shown in FIG. 8 from which the user will be able to select a destination section from the named sections that exist in the diary. Similarly, the user can delete entries that he is not interested in, and move entries to between section. The transfer applet 1609 will add the entries to the AUA-database in the user diary data 122 as requested. In one embodiment, transfer applet 1609 issues a "store" command that is queued in the store queue and checks whether a diary applet is already running. If no diary applet is running, the transfer applet 1609 will start a diary applet automatically.

Following this paragraph is example code, in this case in the JavaScript™ scripting language, of AUAs 134 and the transfer script 136. The example code is intended as part of the Specification. It will be appreciated that each of the four code paragraphs beginning with "W3Content" indicates an AUA.

```
<!DOCTYPE HTML PUBLIC "-//IETF//DTD HTML//EN">
<html>
<head>
<script language="JavaScript">
<!-- don't edit by hand
W3Content_0=" +
'MD1hPXNyYz1odHRwOi8vd3d3LmZlcnJhcmkuaXQvY29udGVudC9mMzAwLmpwZ1xc' +
'bmhlaWdodD0xNjhcXG53aWR0aD0zMjBcXG5cbmU9bGluaz1odHRwOi8vd3d3LmZl' +
'cnJhcmkuaXRcXG5ldHlwZT0xXFxuXG4K';
W3Content_1=" +
'MD1hPXNyYz1odHRwOi8vd3d3LmZlcnJhcmkuaXQvY29udGVudC9mMzAwX2ZyLmpw' +
'Z1xcbmhlaWdodD0yNDdcXG53aWR0aD00MDBcXG5cbmU9bGluaz1odHRwOi8vd3d3' +
'LmZlcnJhcmkuaXRcXG5ldHlwZT0xXFxuXG4K';
W3Content_2=" +
'MD1hPXNyYz1odHRwOi8vd3d3LmZlcnJhcmkuaXQvY29udGVudC9mMzAwX3RvcC5q' +
'cGdcXG5oZWlnaHQ9MTg4XFxud2lkdGg9NDAwXFxuXG51PWxpbms9aHR0cDovL3d3' +
'dy5mZXJyYXJpLml0XFxuZXR5cGU9MVxcblxuCg==';
W3Content_3=" +
'Mj1hPXNyYz1odHRwOi8vd3d3LmZlcnJhcmkuaXQvY29udGVudC9mMzAwLmpwZ1xc' +
'bmhlaWdodD0xNjhcXG53aWR0aD0zMjBcXG5cbmU9bGluaz1odHRwOi8vd3d3LmZl' +
```

-continued

```
'cnJhcmkuaXRcXG5ldHlwZT0xFxuXG4KMT1hPXNyYz1odHRwOi8vd3d3LmZlcnJh' +
'cmkuaXQvY29udGVudC9mMzAwX2ZyLmpwZ1xcbmhlaWdodD0yNDdcXG53aWR0aD00' +
'MDBcXG5cbmU9bGluaz1odHRwOi8vd3d3LmZlcnJhcmkuaXRcXG5ldHlwZT0xFxu' +
'XG4KMD1hPXNyYz1odHRwOi8vd3d3LmZlcnJhcmkuaXQvY29udGVudC9mMzAwX3Rv' +
'cC5qcGdcXG5oZWlnaHQ9MTg4XFxud2lkdGg9NDAwXFxuXG5lPWxpbms9aHR0cDov' +
'L3d3dy5mZXJyYXJpLml0XFxuZXR5cGU9U9MVxcblxuCg==';
function loadTransfer(params) {
    loginWin=open("", getWindowName( ),
           'width=350,height=130,scrollbars=no');
    content = params;
    setTimeout('writeContent(content)', 1000);
}
function writeContent(content) {
    loginWin.document.open( );
    doc = loginWin.document;
    doc.writeln('<HTML><TITLE>Type the location of your W3Diary:</TITLE>');
    doc.writeln('<HEAD>');
    doc.writeln('');
    doc.writeln('<sc' + 'ript language="JavaScript">');
    doc.writeln('');
    doc.writeln('<!-- ');
    doc.writeln('');
    doc.writeln('fu' +
         'nction setCookie(name, value, expires, path, domain, secure) {');
    doc.writeln('   document.cookie = name + "=" + escape (value) + ');
    doc.writeln('      ((expires) ? "; ' +
           ' expires=" + expires.toGMTString( ) : "") +');
    doc.writeln('      ((path) ? "; path=" + path : "") +');
    doc.writeln('      ((domain) ? "; domain=" + domain : "") +');
    doc.writeln('      ((secure) ? "; secure" : "");');
    doc.writeln('}');
    doc.writeln('');
    doc.writeln('fu' + 'nction getCookie(name) {');
    doc.writeln('   va' + 'r arg = name + "=";');
    doc.writeln('   va' + 'r alen = arg.length;');
    doc.writeln('   va' + 'r clen = document.cookie.length;');
    doc.writeln('   va' + 'r i = 0;');
    doc.writeln('   while (i < clen) {');
    doc.writeln('       va' + 'r j = i + alen;');
    doc.writeln('       if (document.cookie.substring(i, j) == arg) {');
    doc.writeln('          va' +
           'r endstr = document.cookie.indexOf(";", j);');
    doc.writeln('          if (endstr == -1) {');
    doc.writeln('             endstr = document.cookie.length;');
    doc.writeln('          }');
    doc.writeln('          re' +
           'turn unescape(document.cookie.substring(j, endstr));');
    doc.writeln('       } ');
    doc.writeln('       i = document.cookie.indexOf(" ", i) + 1;');
    doc.writeln('       if (i == 0) break;');
    doc.writeln('   }');
    doc.writeln('   re' + 'turn "";');
    doc.writeln('}');
    doc.writeln('');
    doc.writeln('fu' + 'nction addContent( ) {');
    doc.writeln('   va' + 'r expire = new Date( );');
    doc.writeln('   va' +
           'r oneDay = expire.getTime( ) + (24 * 60 * 60 * 1000);');
    doc.writeln('   expire.setTime(oneDay);');
    doc.writeln('   setCookie("w3duser",' +
           ' document.nhf.user.value, expire);');
    doc.writeln('   setCookie("w3dhost",' +
           ' document.nhf.host.value, expire);');
    doc.writeln('   document.nhf.action="http://" +' +
           ' document.nhf.host.value +' +
           ' "/transfer/" + document.nhf.user.value;');
    doc.writeln('   // document.nhf.submit( );');
    doc.writeln('');
    doc.writeln('   loginWin=open("", "' +
           getWindowName( ) +
           '", \'width=350,height=130,scrollbars=no\');');
    doc.writeln('   setTimeout(\'writeContent( )\', 1000);');
    doc.writeln('}');
    doc.writeln('');
    doc.writeln('fu' + 'nction writeContent( ) {');
    doc.writeln('   loginWin.document.open( );');
    doc.writeln('   doc = loginWin.document;');
    doc.writeln('   doc.writeln(\'<HTML>\');');
    doc.writeln('doc.writeln(\'<BODY onLoad="document.nw.submit( )">\');');
```

-continued

```
        doc.writeln('doc.writeln(\'<FORM method="POST" name="nw" action="\" +
                ' + document.nhf.action+ \'">\');');
        doc.writeln('   doc.writeln(\'<INPUT type=hidden name="user"
value="\"
                + ' + document.nhf.user.value+ \'">\');');
        doc.writeln('   doc.writeln(\'<INPUT type=hidden name="host"
value="\"
                + ' + document.nhf.host.value+ \'">\');');
        doc.writeln('   doc.writeln(\'<INPUT type=hidden name="content"' +
                ' value="\' + document.nhf.content.value+ \'">\');');
        doc.writeln('   doc.writeln(\'</FORM>\');');
        doc.writeln('   doc.writeln(\'</BODY>\');');
        doc.writeln('   doc.writeln(\'</HTML>\');');
        doc.writeln('   doc.close();');
        doc.writeln('   window.close();');
        doc.writeln('}');
        doc.writeln('');
        doc.writeln('fu' + 'nction initFields() {');
        doc.writein('   document.nhf.user.value=getCookie("w3duser");');
        doc.writeln('   document.nhf.host.value=getCookie("w3dhost");');
        doc.writein('}');
        doc.writeln('            ');
        doc.writeln('// -->');
        doc.writeln('            ');
        doc.writeln('</sc' + 'ript>');
        doc.writeln('            ');
        doc.writeln('</HEAD>');
        doc.writeln('');
        doc.writeln('<BODY bgcolor="#FFFFFF" onLoad="initFields()">');
        doc.writeln('');
        doc.writeln('<FORM method="POST" name="nhf">');
        doc.writeln('<TABLE border=0><TR><TD> user:');
        doc.writeln('<TD COLSPAN=2 align=right>');
        doc.writeln('<INPUT size=30 name="user"><BR>');
        doc.writeln('<TR><TD> host: </TD>');
        doc.writeln('<TD COLSPAN=2 align=right>');
        doc.writeln('<INPUT size=30 name="host"><BR>');
        doc.writeln('<TR><TD></TD><TD>');
        doc.writeln('<INPUT type=button value="Add Content"' +
                ' onClick="addContent()">');
        doc.writeln('</TD><TD align=right>');
        doc.writeln('<INPUT type=button value="Cancel"' +
                ' onClick="window.close()">');
        doc.writeln('</TD></TR></TABLE>');
        doc.writeln('<INPUT type=hidden name="content" value="' +
                content+ '" >');
        doc.writeln('</FORM>');
        doc.writeln('');
        doc.writeln('</BODY>');
        doc.writeln('</HTML>');
        doc.close();
}
function getWindowName() {
    wName = '' + Math.random();
    return 'W3Diary_' + wName.substring(wName.indexOf('.') + 1);
}
// -->
</script>
<meta http-equiv="Content-Type"
content="text/html; charset=iso-8859-1">
<meta name="GENERATOR" content="Microsoft FrontPage 2.0">
<title>CompanyAari Content</title>
</head>
<body bgcolor="#FFFFFF" text="#000000" link="#C70000"
vlink="#C70000" alink="#C70000">
<p align="center"><img src="../images/s_content.gif" width="120"
height="43"> <img src="../images/i_style.gif" width="242"
height="43"></p>
<div align="center"><center>
<table border="0" cellpadding="0" cellspacing="5">
    <tr>
        <td align="center" width="50%">The new 1998 CompanyA product<p>
            <a href = "JavaScript:loadTransfer(W3Content_0)"
        onMouseOver="status='Click to add W3Diary Content';return true;">
            <img
        src="http://www.1stprov.nl/images/w3diary_logo.gif"></a></p>
        </td>
        <td width="50%"><img src="product.jpg" width="200"
        height="120"></td>
```

-continued

```
    </tr>
    <tr>
        <td align="center" width="50%">The new 1998 CompanyA product<p>
            <a href = "JavaScript:loadTransfer(W3Content_1)"
        onMouseOver="status='Click to add W3Diary Content';return true;"><img
            src="http://www.1stprov.nl/images/w3diary_logo.gif"></a></p>
        </td>
        <td width="50%"><img src="product_fr.jpg" width="200"
        height="120"></td>
    </tr>
    <tr>
        <td align="center" width="50%">The new 1998 CompanyA product<p>
            <a href = "JavaScript:loadTransfer(W3Content_2)"
        onMouseOver="status='Click to add W3Diary Content';return true;"><img
            src="http://www.1stprov.nl/images/w3diary_logo.gif"></a></p>
        </td>
        <td width="50%"><img src="product_top.jpg" width="200"
        height="120"></td>
    </tr>
</table>
<p>
Or get them <a href="JavaScript:loadTransfer(W3Content_3)"
onMouseOver="status='Click to add W3Diary Content';return true;">all three</a>
</center></div>
</body>
</html>
```

The foregoing description of the preferred embodiments of the present invention is by way of example only, and other variations and modifications of the above-described embodiments and methods are possible in light of the foregoing teaching. For example, although the embodiments herein have been described with reference to a diary-type system, any system for maintaining an ordered set of object locations, annotations and presentation contexts can alternatively be used. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A computer-based method, comprising the steps of:

receiving from a client a request for access to a content object;

responsive to the request of the client, identifying an annotated universal address (AUA) having a universal address identifying a location of the content object and having an annotation authored by a content provider for controlling an aspect of a presentation of the object, the AUA being present in an AUA database containing one AUA;

responsive to the request of the client, identifying a presentation context for controlling ion behavior of the object; and transmitting to the client the presentation context, the AUA and an applet for dynamically generating a page definition for the presentation of the object, the page definition being generated from the presentation context and the AUA.

2. A computer system comprising:

a first memory storing at least one presentation context;

a second memory storing an annotated universal address (AUA) database, which includes at least one AUA having a universal address identifying a location of a content object and an annotation authored by a content provider for controlling an aspect of a presentation of the object, the second memory being coupled to the first memory;

a third memory storing at least one applet for dynamically generating a page definition for the presentation of the object, from a presentation context and an AUA, the third memory being coupled to the second memory;

a reception module, for receiving a request for access to a content object from a client, the reception module being coupled to the first memory and to the second memory;

an identification module, for identifying, in response to the request from the client, a presentation context and an AUA, for controlling presentation behavior of the object, the identification module being coupled to the first memory, to the second memory, and to the reception module; and a transmission module, for transmitting the presentation context, the AUA and the applet to the client for dynamically generating a page definition for the presentation of the object, the page definition being generated from the presentation context and the AUA, the transmission module being coupled to the reception module.

3. A computer-based method, comprising the steps of:

transmitting a request to access a content object;

responsive to the request, receiving, an annotated universal address (AUA) having a universal address identifying a location of the content object and including an annotation authored by a content provider for controlling an aspect of a presentation of the object;

responsive to the request, receiving a presentation context for controlling presentation behavior of the object;

dynamically generating a page definition for the presentation of the object, using the presentation context and the AUA; and retrieving the object specified by the universal address.

4. A computer-based method, comprising the steps of:
assigning a universal address to a location of a content object;
generating an annotation by a content provider for controlling an aspect of a presentation of the object;
associating the universal address with the annotation generated by a content provider to generate an annotated universal address;
associating a request interface with the annotated universal address;
generating network data for dynamically presenting the object and the request interface; and
enabling transfer of the annotated universal address upon receiving an indication at the request interface.

5. A computer system comprising:
an assignment module for assigning a universal address to a location of a content object;
an annotation module for generating an annotation by a content provider for controlling an aspect of a presentation of the object, the annotation module being coupled to the assignment module;
an association module for associating the universal address with the annotation generated by a content provider to generate an annotated universal address, and for associating a request interface with the annotated universal address, the association module being coupled to the annotation module;
a presentation generation module, for generating network data for dynamically presenting the object and the request interface, the presentation generation module being coupled to the association module; and
a transfer module for enabling transfer of the annotated universal address upon receiving an indication at the request interface.

6. A computer-based method, comprising the steps of:
requesting addition of an annotated universal address (AUA) to an AUA database from which personalized web pages are constructed, the database being on a server, the AUA identifying a location of a content object and including an annotation authored by a content provider for controlling an aspect of a presentation of the object;
receiving a transfer script in response to the request;
initiating execution of the transfer script to request a transfer applet from the server; and
initiating execution of the transfer applet to transfer the AUA to the AUA database on the server.

7. A computer system comprising:
third party memory storing a transfer script that generates a request for a transfer applet from server memory;
server memory storing an AUA database from which personalized web pages are constructed and a transfer applet for establishing a communications link between a client browser and the server memory; and
a client browser coupled to the third party memory and to the server memory for executing the transfer script and the transfer applet to transfer an AUA to an AUA database stored in the server memory, the AUA identifying a location of a content object and including an annotation authored by a content provider for controlling an aspect of a presentation of the object.

8. The method of claim 1 wherein the annotation further comprises:
at least one content provider authored restriction concerning subsequent presentation of the object.

9. The system of claim 2 wherein the annotation further comprises:
at least one content provider authored restriction concerning subsequent presentation of the object.

10. The method of claim 3 wherein the annotation further comprises:
at least one content provider authored restriction concerning subsequent presentation of the object.

11. The method of claim 3 wherein the page definition further comprises:
a definition of a personalized diary page.

12. The method of claim 4 wherein the annotation further comprises:
at least one content provider authored restriction concerning subsequent presentation of the object.

13. The system of claim 5 wherein the annotation further comprises:
at least one content provider authored restriction concerning subsequent presentation of the object.

14. The method of claim 6 wherein each personalized web page further comprises:
a user personalized diary page.

15. The method of claim 6 wherein each AUA further comprises:
an address for locating an object; and
at least one content provider authored annotation for controlling at least one aspect of the object.

16. The method of claim 15 wherein the annotation further comprises:
at least one content provider authored restriction concerning subsequent presentation of the object.

17. The system of claim 7 wherein each personalized web page further comprises:
a user personalized diary page.

18. The system of claim 7 wherein each AUA further comprises:
an address for locating an object; and
at least one content provider authored annotation for controlling at least one aspect of the object.

19. The system of claim 18 wherein the annotation further comprises:
at least one content provider authored restriction concerning subsequent presentation of the object.

20. A computer program product, on a computer readable medium, the computer program product comprising:
program code for receiving from a client a request for access to a content object;
program code for identifying, responsive to the request of the client, an annotated universal address (AUA) having a universal address identifying a location of the content object and having an annotation authored by a content provider for controlling an aspect of a presentation of the object, the AUA being present in an AUA database containing at least one AUA;
program code for identifying, responsive to the request of the client, a presentation context for controlling presentation behavior of the object; and
program code for transmitting to the client the presentation context, the AUA and an applet for dynamically generating a page definition for the presentation of the object, the page definition being generated from the presentation context and the AUA.

21. A computer program product, on a computer readable medium, the computer program product comprising:

program code for transmitting a request to access a content object;

program code for receiving, responsive to the request, an annotated universal address (AUA) having a universal address identifying a location of the content object and including an annotation authored by a content provider for controlling an aspect of a presentation of the object;

program code for receiving, responsive to the request, a presentation context for controlling presentation behavior of the object;

program code for dynamically generating a page definition for the presentation of the object, using the presentation context and the AUA; and program code for retrieving the object specified by the universal address.

22. A computer program product, on a computer readable medium, the computer program product comprising:

program code for assigning a universal address to a location of a content object;

program code for generating an annotation by a content provider for controlling an aspect of a presentation of the object;

program code for associating the universal address with the annotation generated by a content provider to generate an annotated universal address;

program code for associating a request interface with the annotated universal address;

program code for generating network data for dynamically presenting the object and the request interface; and program code for enabling transfer of the annotated universal address upon receiving an indication at the request interface.

23. A computer program product, on a computer readable medium, the computer program product comprising:

program code for requesting addition of an annotated universal address (AUA) to an AUA database from which personalized web pages are constructed, the database being on a server, the AUA identifying a location of a content object and including an annotation authored by a content provider for controlling an aspect of a presentation of the object; program code for receiving a transfer script in response to the request;

program code for initiating execution of the transfer script to request a transfer applet from the server; and program code for initiating execution of the transfer applet to transfer the AUA to the AUA database on the server.

24. The method of claim 3 further comprising:

presenting the content object according to the page definition.

* * * * *

UNITED STATES PATENT AND TRADEMARK OFFICE
CERTIFICATE OF CORRECTION

PATENT NO. : 6,289,362 B1
DATED : September 11, 2001
INVENTOR(S) : Joannes Jozef Everardus van der Meer It is certified that error appears in the above-identified patent and that said Letters Patent is hereby corrected as shown below:

<u>Column 19,</u>
Line 57, add -- at least -- after the word "containing".
Line 60, delete "ion" and replace with -- presentation --.

Signed and Sealed this

Twenty-eighth Day of May, 2002

Attest:

JAMES E. ROGAN
Attesting Officer
Director of the United States Patent and Trademark Office